United States Patent
Huang et al.

(10) Patent No.: US 10,362,496 B2
(45) Date of Patent: Jul. 23, 2019

(54) LINK CONTROL NODE AND METHOD, AND COMMUNICATIONS SYSTEM

(71) Applicant: Huawei Technologies Co., Ltd., Shenzhen (CN)

(72) Inventors: Min Huang, Shanghai (CN); Xian Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 114 days.

(21) Appl. No.: 15/411,787

(22) Filed: Jan. 20, 2017

(65) Prior Publication Data

US 2017/0134971 A1    May 11, 2017

Related U.S. Application Data

(63) Continuation of application No. PCT/CN2014/082638, filed on Jul. 21, 2014.

(51) Int. Cl.
*H04L 12/24* (2006.01)
*H04L 29/06* (2006.01)
(Continued)

(52) U.S. Cl.
CPC ......... *H04W 24/02* (2013.01); *H04L 41/0893* (2013.01); *H04L 45/24* (2013.01); *H04L 69/14* (2013.01); *H04W 80/06* (2013.01)

(58) Field of Classification Search
CPC ..... H04L 45/24; H04L 45/245; H04L 47/193; H04L 61/2007; H04L 69/14; H04L 69/16; H04L 69/163; H04L 45/16; H04L 47/32; H04L 69/18; H04W 76/15; H04W 76/16; H04W 84/12; H04W 88/06; H04W 80/06
See application file for complete search history.

(56) References Cited

U.S. PATENT DOCUMENTS

| | | | | |
|---|---|---|---|---|
| 6,360,265 B1 * | 3/2002 | Falck | ................ | H04L 29/06027 370/466 |
| 6,408,184 B1 * | 6/2002 | Kallio | .................. | H04W 48/18 370/331 |

(Continued)

FOREIGN PATENT DOCUMENTS

| | | |
|---|---|---|
| CN | 102761470 A | 10/2012 |
| CN | 103004167 A | 3/2013 |

(Continued)

OTHER PUBLICATIONS

Vondrous et al., Multipath TCP in LTE networks; Dec. 2014, Advances in Electrical and Electronic Engineering, Version 12, Issue 4, DOI:12. 10.15598/aeee.v12i4.1210 (Year: 2014).*

(Continued)

*Primary Examiner* — Eric Nowlin
(74) *Attorney, Agent, or Firm* — Leydig, Voit & Mayer, Ltd.

(57) ABSTRACT

Embodiments of the present invention provide a link control node and method, and a system. An MPTCP sublink is identified; and from the MPTCP sublink, a first MPTCP sublink on which link control needs to be performed is determined, and an adjustment manner applicable to the first MPTCP sublink is determined. By adding centralized management and control measures on MPTCP connections, a data transmission process on each MPTCP sublink can be performed on an expected communication link, which adapts to running requirements of a system. Therefore, radio resources can be appropriately allocated, and system performance can be improved.

15 Claims, 7 Drawing Sheets

(51) Int. Cl.
  *H04W 24/02*   (2009.01)
  *H04W 80/06*   (2009.01)
  *H04L 12/707*  (2013.01)

(56) References Cited

U.S. PATENT DOCUMENTS

| | | | | |
|---|---|---|---|---|
| 6,775,277 B1* | 8/2004 | Li | ............................ | H04L 29/06 370/389 |
| 7,801,157 B2* | 9/2010 | Li | ............................ | H04L 29/06 370/352 |
| 8,400,923 B2* | 3/2013 | Kini | ........................ | H04L 45/24 370/235 |
| 8,547,835 B2* | 10/2013 | Haddad | ............. | H04L 29/12405 370/230 |
| 8,547,938 B2* | 10/2013 | Haddad | ................. | H04W 76/23 370/332 |
| 8,817,797 B2* | 8/2014 | Hampel | ................... | H04L 69/16 370/230 |
| 8,868,733 B2* | 10/2014 | Livet | .................... | H04W 60/005 709/224 |
| 9,225,630 B2* | 12/2015 | Gouache | ................. | H04L 45/24 |
| 9,350,672 B2* | 5/2016 | Patwardhan | ........... | H04L 47/193 |
| 9,451,415 B2* | 9/2016 | Krishnaswamy | ....... | H04W 4/06 |
| 9,455,897 B2* | 9/2016 | Krishnaswamy | ....... | H04L 45/00 |
| 9,456,464 B2* | 9/2016 | Biswas | .................... | H04L 45/24 |
| RE46,195 E * | 11/2016 | Kini | ........................ | H04L 45/24 |
| 9,503,223 B2* | 11/2016 | Wu | ........................ | H04L 1/1825 |
| 9,742,628 B2* | 8/2017 | Kim | .................... | H04L 41/0826 |
| 9,762,702 B2* | 9/2017 | Biswas | ................. | H04W 76/10 |
| 9,800,943 B2* | 10/2017 | S | .......................... | H04N 21/631 |
| 9,826,560 B2* | 11/2017 | Kweon | ................... | H04L 45/24 |
| 9,843,522 B2* | 12/2017 | Ramamoorthy | ........ | H04L 69/16 |
| 9,871,723 B2* | 1/2018 | Teyeb | ..................... | H04L 45/24 |
| 9,948,725 B2* | 4/2018 | Biswas | ................... | H04L 45/24 |
| 10,009,259 B2* | 6/2018 | Calmon | ............ | H04B 7/15521 |
| 10,021,690 B2* | 7/2018 | Richards | ................ | H04W 4/70 |
| 10,075,987 B2* | 9/2018 | Teyeb | ..................... | H04L 69/14 |
| 10,103,896 B2* | 10/2018 | Roeland | ................ | H04W 76/15 |
| 10,104,578 B2* | 10/2018 | Huang | ................... | H04W 28/04 |
| 10,110,641 B2* | 10/2018 | Detal | ................... | H04L 65/1069 |
| 10,142,965 B2* | 11/2018 | Kanugovi | ................ | H04L 69/16 |
| 10,182,131 B2* | 1/2019 | Boucadair | ............... | H04L 69/14 |
| 2005/0008005 A1* | 1/2005 | Li | ........................... | H04L 29/06 370/352 |
| 2006/0133343 A1* | 6/2006 | Huang | ............... | H04L 29/12009 370/349 |
| 2007/0002822 A1* | 1/2007 | Huang | ............... | H04L 29/06027 370/349 |
| 2007/0087756 A1 | 4/2007 | Hoffberg et al. | | |
| 2011/0296006 A1 | 12/2011 | Krishnaswamy et al. | | |
| 2012/0093150 A1* | 4/2012 | Kini | ........................ | H04L 45/24 370/389 |
| 2012/0099601 A1* | 4/2012 | Haddad | ............. | H04L 29/12405 370/401 |
| 2012/0144062 A1* | 6/2012 | Livet | ...................... | H04L 45/24 709/239 |
| 2012/0188979 A1* | 7/2012 | Haddad | ............. | H04W 76/23 370/331 |
| 2012/0226802 A1* | 9/2012 | Wu | ....................... | H04L 1/1825 709/224 |
| 2012/0271938 A1* | 10/2012 | Livet | ................... | H04W 60/005 709/224 |
| 2012/0321008 A1* | 12/2012 | Krishnaswamy | ....... | H04W 4/06 375/267 |
| 2012/0331160 A1* | 12/2012 | Tremblay | ............. | H04L 69/14 709/228 |
| 2013/0064198 A1* | 3/2013 | Krishnaswamy | ....... | H04L 45/24 370/329 |
| 2013/0077501 A1* | 3/2013 | Krishnaswamy | .... | H04L 47/193 370/252 |
| 2013/0114481 A1 | 5/2013 | Kim et al. | | |
| 2013/0195004 A1* | 8/2013 | Hampel | ................. | H04L 69/16 370/315 |
| 2013/0195106 A1* | 8/2013 | Calmon | ............. | H04B 7/15521 370/389 |
| 2013/0275609 A1* | 10/2013 | Cui | ........................ | H04W 8/085 709/230 |
| 2013/0279331 A1 | 10/2013 | Pluntke et al. | | |
| 2013/0318239 A1 | 11/2013 | Scharf et al. | | |
| 2014/0362765 A1* | 12/2014 | Biswas | ................... | H04L 45/24 370/328 |
| 2015/0063211 A1* | 3/2015 | Kim | ......................... | H04L 45/24 370/328 |
| 2015/0121473 A1* | 4/2015 | Yang | ..................... | H04L 45/306 726/4 |
| 2015/0201046 A1* | 7/2015 | Biswas | ................ | H04W 76/10 370/329 |
| 2015/0215225 A1* | 7/2015 | Mildh | ..................... | H04L 69/14 370/236 |
| 2015/0237525 A1* | 8/2015 | Mildh | ..................... | H04L 47/15 370/230.1 |
| 2015/0263959 A1* | 9/2015 | Patwardhan | .......... | H04L 47/193 370/235 |
| 2015/0282219 A1* | 10/2015 | Kweon | ................. | H04W 76/12 370/235 |
| 2016/0037428 A1* | 2/2016 | Kanugovi | ............... | H04L 69/16 370/329 |
| 2016/0112239 A1* | 4/2016 | Kanugovi | ............. | H04W 88/16 370/338 |
| 2016/0205586 A1* | 7/2016 | Kim | ......................... | H04L 1/1607 370/230 |
| 2016/0212759 A1* | 7/2016 | Schliwa-Bertling | .... | H04L 69/14 |
| 2016/0242180 A1* | 8/2016 | Richards | ................ | H04W 4/70 |
| 2016/0261722 A1* | 9/2016 | Paasch | ................... | H04L 47/193 |
| 2016/0277247 A1* | 9/2016 | Kim | .................... | H04L 41/0826 |
| 2016/0309534 A1* | 10/2016 | Teyeb | .................... | H04L 69/14 |
| 2016/0315976 A1* | 10/2016 | Detal | .................... | H04L 65/1069 |
| 2016/0360557 A1* | 12/2016 | Lavi | ..................... | H04W 76/10 |
| 2016/0366049 A1* | 12/2016 | Achouri | ................. | H04L 45/24 |
| 2016/0373339 A1* | 12/2016 | Teyeb | .................... | H04L 45/24 |
| 2016/0373533 A1* | 12/2016 | Biswas | ................... | H04L 45/24 |
| 2017/0019857 A1* | 1/2017 | Han | .................... | H04W 52/0251 |
| 2017/0027016 A1* | 1/2017 | Suga | ..................... | H04L 69/16 |
| 2017/0041836 A1* | 2/2017 | Huang | ................... | H04L 29/06 |
| 2017/0048074 A1* | 2/2017 | Roeland | ................ | H04W 76/15 |
| 2017/0078206 A1* | 3/2017 | Huang | ................... | H04L 47/193 |
| 2017/0085484 A1* | 3/2017 | Hellander | .............. | H04L 69/14 |
| 2017/0105138 A1* | 4/2017 | Huang | ................... | H04W 28/04 |
| 2017/0118022 A1* | 4/2017 | Long | .................... | H04L 63/126 |
| 2017/0118787 A1* | 4/2017 | Kekki | ................. | H04W 76/025 |
| 2017/0134971 A1* | 5/2017 | Huang | ................... | H04L 45/24 |
| 2017/0142233 A1* | 5/2017 | Boucadair | .............. | H04L 69/18 |
| 2017/0237652 A1* | 8/2017 | Calmon | ............ | H04B 7/15521 370/315 |
| 2017/0303123 A1* | 10/2017 | Villar | .................... | H04L 67/18 |
| 2017/0318130 A1* | 11/2017 | Ripke | .................... | H04L 69/16 |
| 2017/0318484 A1* | 11/2017 | Lindheimer | .......... | H04W 40/02 |
| 2017/0339219 A1* | 11/2017 | Le | ........................ | H04L 69/163 |
| 2017/0346724 A1* | 11/2017 | Calin | .................... | H04L 45/24 |
| 2018/0027097 A1* | 1/2018 | Boucadair | .............. | H04L 69/14 370/401 |
| 2018/0034691 A1* | 2/2018 | Amend | ................ | H04L 41/0806 |
| 2018/0062979 A1* | 3/2018 | Zee | ......................... | H04W 80/06 |
| 2018/0084597 A1* | 3/2018 | Kanagarathinam | ... | H04W 76/18 |
| 2018/0103123 A1* | 4/2018 | Skog | .................... | H04L 67/142 |
| 2018/0139136 A1* | 5/2018 | Yong | .................... | H04L 47/125 |
| 2018/0176307 A1* | 6/2018 | Kancherla | .............. | H04L 67/141 |
| 2018/0184474 A1* | 6/2018 | Skog | ...................... | H04L 67/14 |
| 2018/0212883 A1* | 7/2018 | Wei | ........................ | H04L 29/06 |
| 2018/0213041 A1* | 7/2018 | Biswas | ................... | H04L 45/24 |
| 2018/0234335 A1* | 8/2018 | Sridhar | ................. | H04L 47/14 |
| 2018/0248784 A1* | 8/2018 | Fukada | ................. | H04L 45/22 |
| 2018/0254911 A1* | 9/2018 | Arnal | .................. | H04B 7/18502 |
| 2018/0302941 A1* | 10/2018 | Li | ......................... | H04W 36/12 |
| 2019/0037054 A1* | 1/2019 | Bifulco | ................. | H04L 69/163 |

FOREIGN PATENT DOCUMENTS

| | | |
|---|---|---|
| CN | 103155518 A | 6/2013 |
| CN | 103379551 A | 10/2013 |

(56) References Cited

FOREIGN PATENT DOCUMENTS

| | | |
|---|---|---|
| CN | 103888380 A | 6/2014 |
| CN | 103918304 A | 7/2014 |
| EP | 3133784 A1 | 2/2017 |
| JP | 2012134753 A | 7/2012 |
| JP | 2014511624 A | 5/2014 |
| KR | 20130018858 A | 2/2013 |
| KR | 20140077936 A | 6/2014 |
| WO | WO 2014044333 A1 | 3/2014 |

OTHER PUBLICATIONS

Zhou et al., Multipath TCP for User Cooperation in LTE Networks, Jan. 26, 2015, IEEE Network, vol. 29, Issue 1, DOI: 10.1109/MNET.2015.7018199 (Year: 2015).*

Ford et al., RFC 6824: TCP Extensions for Multipath Operation with Multiple Addresses, Jan. 2013, Internet Engineering Task Force (IETF) (Year: 2013).*

Raiciu et al., RFC 6356: Coupled Condgestion Control for Multipath Transport Protocols, Oct. 2011, Internet Engineering Task Force (IETF) (Year: 2011).*

Wischik et al., Design, Implementaion, and Evaluation of Congestion Control for Multipath TCP, Mar. 2011, Proceedings of the 8th USENIX conference on Networked systems design and implementation (Year: 2011).*

Wing et al., "Multipath TCP (MPTCP) Path Selection using PCP draft-wing-mptcp-pcp-00," Internet Draft, Standards Track, MPTCP, XP15095076A, pp. 1-10, (Oct. 7, 2013).

Ford et al., "TCP Extensions for Multipath Operation with Multiple Addresses," Request for Comments: 6824, Experimental, Internet Engineering Task Force (Jan. 2013).

* cited by examiner

LINK CONTROL NODE AND METHOD, AND COMMUNICATIONS SYSTEM

CROSS-REFERENCE TO RELATED APPLICATIONS

This application is a continuation of International Application No. PCT/CN2014/082638, filed on Jul. 21, 2014, the disclosure of which is hereby incorporated by reference in its entirety.

TECHNICAL FIELD

Embodiments of the present invention relate to the field of communications technologies, and in particular, to a link control node and method, and a communications system.

BACKGROUND

With development of multiple wireless broadband access technologies, a piece of user equipment (UE) may have multiple data transmission links to a destination node. The Multipath Transmission Control Protocol (MPTCP) is developed based on the conventional Transmission Control Protocol (TCP) protocol, may provide end-to-end multilink communication for user equipment, and may distribute service data to multiple links in a resource sharing manner to increase network bandwidth.

As an end-to-end protocol, the MPTCP focuses more on how to optimize performance of communication parties. However, there is no measure for centrally managing and controlling MPTCP connections, a status of an MPTCP link cannot be adjusted according to expected requirements of system running, and therefore radio resources cannot be appropriately allocated. A performance algorithm defined in the MPTCP protocol cannot achieve the best optimization in a wireless network either.

SUMMARY

Embodiments of the present invention provide a link control node and method, and a communications system, so as to centrally manage and control MPTCP connections.

According to a first aspect, an embodiment of the present invention provides a link control node, including:

a processing unit, configured to identify, according to Multipath Transmission Control Protocol (MPTCP) link information, an MPTCP sublink that belongs to an MPTCP connection, determine, from the MPTCP sublink, a first MPTCP sublink on which link control needs to be performed, and determine an adjustment manner applicable to the first MPTCP sublink; and a sending unit, configured to send an indication message to two communication parties that use the MPTCP connection, where the indication message is used to instruct the two communication parties to perform the adjustment manner.

With reference to a first possible implementation manner of the first aspect, that the processing unit is configured to determine, from the MPTCP sublink, the first MPTCP sublink on which link control needs to be performed includes:

determining whether a radio resource status of a network node corresponding to the MPTCP sublink meets a first preset condition, and determining, from an MPTCP sublink corresponding to a network node that does not meet the first preset condition and according to an operator management and control policy, at least one MPTCP sublink corresponding to the network node as the first MPTCP sublink, or determining whether a link quality status of the MPTCP sublink meets a preset second condition, and determining, from an MPTCP sublink that does not meet the preset second condition and according to an operator management and control policy, at least one MPTCP sublink as the first MPTCP sublink; where the network node is located on a transmission path of the MPTCP sublink and is configured to support data communication between the two communication parties.

With reference to any one of the foregoing possible implementation manners, in a second possible implementation manner of the first aspect, that the processing unit is configured to determine an adjustment manner applicable to the first MPTCP sublink includes:

when the radio resource status of the network node and/or the link quality status of the MPTCP sublink corresponding to the network node indicate or indicates that a load of the network node exceeds a first preset threshold, determining that the adjustment manner is stopping the first MPTCP sublink from completing a TCP subflow joining process; or when the link quality status of the MPTCP sublink indicates that link performance of the first MPTCP sublink is lower than a second preset threshold, and a current status of the first MPTCP sublink indicates that the first MPTCP sublink is available, determining that the adjustment manner is deleting the first MPTCP sublink; or when the link quality status of the MPTCP sublink indicates that link performance of the first MPTCP sublink is higher than a third preset threshold, and a current status of the first MPTCP sublink indicates that the first MPTCP sublink is a secondary link, determining that the adjustment manner is increasing a priority of the first MPTCP sublink.

With reference to any one of the foregoing possible implementation manners, in a fourth possible implementation manner of the first aspect, the processing unit is specifically configured to determine, according to a link adjustment policy, the first MPTCP sublink and the adjustment manner applicable to the first MPTCP sublink, where the link adjustment policy includes first MPTCP link information that is used to identify the first MPTCP sublink, and command information that is used to indicate the adjustment manner.

With reference to the fourth possible implementation manner of the first aspect, in a fifth possible implementation manner of the first aspect, the link adjustment policy is determined based on at least one condition of an operator management and control policy, a radio resource status of a network node corresponding to the MPTCP sublink, or a link quality status of the MPTCP sublink.

With reference to the fifth possible implementation manner of the first aspect, in a sixth possible implementation manner of the first aspect, the control node further includes:

a receiving unit, configured to receive a measurement report that is reported by the network node corresponding to the MPTCP sublink;

that the processing unit is configured to determine the link adjustment policy includes:

determining the link adjustment policy according to the link quality status of the MPTCP sublink and/or the radio resource status of the network node corresponding to the MPTCP sublink that are or is indicated by the measurement report, and also according to the operator management and control policy.

With reference to any one of the fourth to sixth possible implementation manners of the first aspect, in a seventh possible implementation manner of the first aspect, that the processing unit is configured to determine the first MPTCP sublink according to the link adjustment policy includes:

searching in the identified MPTCP sublink according to the first MPTCP link information that is used to identify the first MPTCP sublink and that is included in the link adjustment policy, and using an MPTCP sublink whose MPTCP link information is the same as the first MPTCP link information as the first MPTCP sublink.

With reference to any one of the foregoing possible implementation manners, in an eighth possible implementation manner of the first aspect, that the processing unit is configured to identify, according to the MPTCP link information, the MPTCP sublink that belongs to the MPTCP connection includes:

obtaining MPTCP link information of a to-be-identified MPTCP sublink, matching the to-be-identified MPTCP sublink with an MPTCP primary link according to MPTCP link information of the MPTCP primary link that belongs to the MPTCP connection, and determining a to-be-identified MPTCP sublink that matches the MPTCP primary link as the identified MPTCP sublink.

With reference to any one of the foregoing possible implementation manners, in a ninth possible implementation manner of the first aspect, the processing unit is further configured to parse signaling that is exchanged in a communication process of the two communication parties that use the MPTCP connection, to obtain the MPTCP link information.

According to a second aspect, an embodiment of the present invention provides a network node, including:

a processing unit, configured to determine a link adjustment policy, where the link adjustment policy is used to instruct to determine, from a Multipath Transmission Control Protocol (MPTCP) sublink that corresponds to the network node and belongs to an MPTCP connection, a first MPTCP sublink on which link control needs to be performed, and determine an adjustment manner applicable to the first MPTCP sublink; and a sending unit, configured to send the link adjustment policy to the link control node; where the network node is located on a transmission path of the MPTCP sublink and is configured to support data communication between two communication parties that use the MPTCP connection.

In a first possible implementation manner of the second aspect, the link adjustment policy includes first MPTCP link information that is used to identify the first MPTCP sublink, and command information that is used to indicate the adjustment manner.

With reference to any one of the foregoing possible implementation manners, in a second possible implementation manner of the second aspect, that the processing unit is configured to determine the link adjustment policy includes:

determining whether a radio resource status of the network node meets a first preset condition, and determining, when the radio resource status of the network node does not meet the first preset condition and according to an operator management and control policy, at least one MPTCP sublink corresponding to the network node as the first MPTCP sublink, or determining whether a link quality status of the MPTCP sublink meets a preset second condition, and determining, from an MPTCP sublink that does not meet the preset second condition and according to an operator management and control policy, at least one MPTCP sublink as the first MPTCP sublink.

With reference to any one of the foregoing possible implementation manners, in a third possible implementation manner of the second aspect, that the processing unit is configured to determine the link adjustment policy includes:

when the radio resource status of the network node and/or the link quality status of the MPTCP sublink indicates or indicates that a load of the network node exceeds a first preset threshold, determining that the adjustment manner is stopping the first MPTCP sublink from completing a TCP subflow joining process; or when the link quality status of the MPTCP sublink indicates that link performance of the first MPTCP sublink is lower than a second preset threshold, and a current status of the first MPTCP sublink indicates that the first MPTCP sublink is available, determining that the adjustment manner is deleting the first MPTCP sublink; or when the link quality status of the MPTCP sublink indicates that link performance of the first MPTCP sublink is higher than a third preset threshold, and a current status of the first MPTCP sublink indicates that the first MPTCP sublink is a secondary link, determining that the adjustment manner is increasing a priority of the first MPTCP sublink.

With reference to any one of the foregoing possible implementation manners, in a fourth possible implementation manner of the second aspect, the processing unit is further configured to parse signaling that is exchanged in a communication process of the two communication parties that use the MPTCP connection, to obtain MPTCP link information of the MPTCP sublink.

According to a third aspect, an embodiment of the present invention provides a link control method, including:

identifying, by a link control node according to Multipath Transmission Control Protocol (MPTCP) link information, an MPTCP sublink that belongs to an MPTCP connection;

determining, by the link control node from the MPTCP sublink, a first MPTCP sublink on which link control needs to be performed, and determining an adjustment manner applicable to the first MPTCP sublink; and instructing, by the link control node, two communication parties that use the MPTCP connection to adjust the first MPTCP sublink according to the adjustment manner.

In a first possible implementation manner of the third aspect, the determining, by the link control node from the MPTCP sublink, a first MPTCP sublink on which link control needs to be performed includes:

determining whether a radio resource status of a network node corresponding to the MPTCP sublink meets a first preset condition, and determining, from an MPTCP sublink corresponding to a network node that does not meet the first preset condition and according to an operator management and control policy, at least one MPTCP sublink corresponding to the network node as the first MPTCP sublink, or determining whether a link quality status of the MPTCP sublink meets a preset second condition, and determining, from an MPTCP sublink that does not meet the preset second condition and according to an operator management and control policy, at least one MPTCP sublink as the first MPTCP sublink; where the network node is located on a transmission path of the MPTCP sublink and is configured to support data communication between the two communication parties.

With reference to any one of the foregoing possible implementation manners, in a second possible implementation manner of the third aspect, the determining an adjustment manner applicable to the first MPTCP sublink includes:

when the radio resource status of the network node and/or the link quality status of the MPTCP sublink corresponding to the network node indicate or indicates that a load of the network node exceeds a first preset threshold, determining that the adjustment manner is stopping the first MPTCP sublink from completing a TCP subflow joining process; or when the link quality status of the MPTCP sublink indicates that link performance of the first MPTCP sublink is lower than a second preset threshold, and a current status of the first MPTCP sublink indicates that the first MPTCP sublink is available, determining that the adjustment manner is deleting the first MPTCP sublink; or when the link quality status of the MPTCP sublink indicates that link performance of the first MPTCP sublink is higher than a third preset threshold, and a current status of the first MPTCP sublink indicates that the first MPTCP sublink is a secondary link, determining that the adjustment manner is increasing a priority of the first MPTCP sublink.

With reference to any one of the foregoing possible implementation manners, in a third possible implementation manner of the third aspect, the determining, by the link control node from the MPTCP sublink, a first MPTCP sublink on which link control needs to be performed, and determining an adjustment manner applicable to the first MPTCP sublink includes:

determining, by the link control node according to a link adjustment policy, the first MPTCP sublink and the adjustment manner applicable to the first MPTCP sublink, where the link adjustment policy includes first MPTCP link information that is used to identify the first MPTCP sublink, and command information that is used to indicate the adjustment manner.

With reference to the third possible implementation manner of the third aspect, in a fourth possible implementation manner of the third aspect, the link adjustment policy is determined based on at least one condition of an operator management and control policy, a radio resource status of a network node corresponding to the MPTCP sublink, or a link quality status of the MPTCP sublink.

With reference to the fourth possible implementation manner of the third aspect, in a fifth possible implementation manner of the third aspect, the determining, by the link control node, the link adjustment policy includes: receiving, by the link control node, a measurement report that is reported by the network node corresponding to the MPTCP sublink, and determining the link adjustment policy according to the link quality status of the MPTCP sublink and/or the radio resource status of the network node corresponding to the MPTCP sublink that are or is indicated by the measurement report, and also according to the operator management and control policy.

With reference to any one of the fourth to sixth possible implementation manners of the third aspect, in a sixth possible implementation manner of the third aspect, the determining, by the link control node, the first MPTCP sublink according to a link adjustment policy includes:

searching in the identified MPTCP sublink according to the first MPTCP link information that is used to identify the first MPTCP sublink and that is included in the link adjustment policy, and using an MPTCP sublink whose MPTCP link information is the same as the first MPTCP link information as the first MPTCP sublink.

With reference to any one of the foregoing possible implementation manners, in an eighth possible implementation manner of the third aspect, the identifying, according to MPTCP link information, an MPTCP sublink that belongs to an MPTCP connection includes: obtaining MPTCP link information of a to-be-identified MPTCP sublink, matching the to-be-identified MPTCP sublink with an MPTCP primary link according to MPTCP link information of the MPTCP primary link that belongs to the MPTCP connection, and determining a to-be-identified MPTCP sublink that matches the MPTCP primary link as the identified MPTCP sublink.

With reference to any one of the foregoing possible implementation manners, in a ninth possible implementation manner of the third aspect, the method further includes: parsing signaling that is exchanged in a communication process of the two communication parties that use the MPTCP connection, to obtain the MPTCP link information.

According to a fourth aspect, an embodiment of the present invention provides a link control method, including:

determining, by a network node, a link adjustment policy, where the link adjustment policy is used to instruct to determine, from a Multipath Transmission Control Protocol (MPTCP) sublink that corresponds to the network node and belongs to an MPTCP connection, a first MPTCP sublink on which link control needs to be performed, and determining an adjustment manner applicable to the first MPTCP sublink; and sending, by the network node, the link adjustment policy to the link control node, where the network node is located on a transmission path of the MPTCP sublink and is configured to support data communication between two communication parties that use the MPTCP connection.

In a first possible implementation manner of the fourth aspect, the link adjustment policy includes first MPTCP link information that is used to identify the first MPTCP sublink, and command information that is used to indicate the adjustment manner.

With reference to any one of the foregoing possible implementation manners, in a second possible implementation manner of the fourth aspect, the determining, by a network node, a link adjustment policy includes:

determining whether a radio resource status of the network node meets a first preset condition, and determining, when the radio resource status of the network node does not meet the first preset condition and according to an operator management and control policy, at least one MPTCP sublink corresponding to the network node as the first MPTCP sublink, or determining whether a link quality status of the MPTCP sublink meets a preset second condition, and determining, from an MPTCP sublink that does not meet the preset second condition and according to an operator management and control policy, at least one MPTCP sublink as the first MPTCP sublink.

With reference to any one of the foregoing possible implementation manners, in a third possible implementation manner of the fourth aspect, the determining, by a network node, a link adjustment policy includes:

when the radio resource status of the network node and/or the link quality status of the MPTCP sublink indicates or indicates that a load of the network node exceeds a first preset threshold, determining that the adjustment manner is stopping the first MPTCP sublink from completing a TCP subflow joining process; or when the link quality status of the MPTCP sublink indicates that link performance of the first MPTCP sublink is lower than a second preset threshold, and a current status of the first MPTCP sublink indicates that the first MPTCP sublink is available, determining that the adjustment manner is deleting the first MPTCP sublink; or when the link quality status of the MPTCP sublink indicates that link performance of the first MPTCP sublink is higher than a third preset threshold, and a current status of the first MPTCP sublink indicates that the first MPTCP sublink is a secondary link, determining that the adjustment manner is increasing a priority of the first MPTCP sublink.

With reference to any one of the foregoing possible implementation manners, in a fourth possible implementation manner of the fourth aspect, the method further includes: parsing signaling that is exchanged in a communication process of the two communication parties that use the MPTCP connection, to obtain MPTCP link information of the MPTCP sublink.

With technical solutions provided in the embodiments of the present invention, an MPTCP sublink that is suitable for link adjustment may be appropriately selected and its adjustment manner may be determined. By adding centralized management and control measures on MPTCP connections, a data transmission process on each MPTCP sublink can be performed on an expected communication link, which adapts to running requirements of a system. Therefore, radio resources can be appropriately allocated, and system performance can be improved. Furthermore, a link control node provided in the embodiments of the present invention may be flexibly disposed on an access network side, to effectively manage and control an MPTCP connection.

BRIEF DESCRIPTION OF DRAWINGS

To describe the technical solutions in the embodiments of the present invention more clearly, the following briefly describes the accompanying drawings for describing the embodiments. The accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
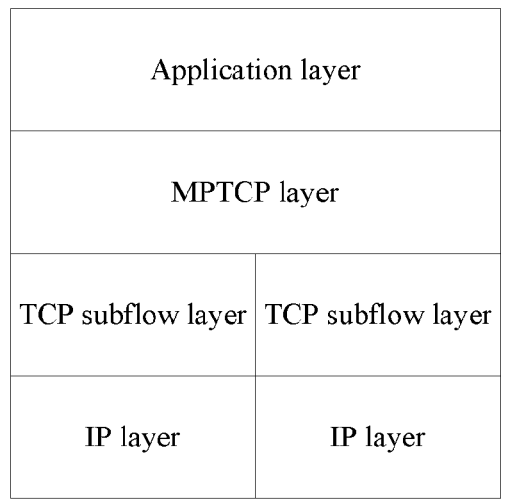
FIG. 1 is a schematic diagram of an MPTCP protocol stack.

To make the objectives, technical solutions, and advantages of the present invention clearer, the following further describes implementation manners of the present invention in detail with reference to the accompanying drawings.

Technologies described in the specification may be applied to various communications systems, such as current 2G and 3G communications system and the next-generation communications system. For example, a Global System for Mobile Communications (GSM) system, a Code Division Multiple Access (CDMA) system, a Time Division Multiple Access (TDMA) system, a Wideband Code Division Multiple Access (WCDMA) system, a Long Term Evolution (LTE) system and a subsequent evolved system, a wireless local area network (WLAN), and other wireless broadband access networks.

It should be noted that a network node described in embodiments of the present invention refers to an access device in an access network. For example, the network node may be a base transceiver station (BTS) in GSM or CDMA, or may be a NodeB in WCDMA, or may be an evolved NodeB (e-NodeB) in LTE, or an access point (AP) in a WLAN, or may be a network element that has a similar function in another communications or wireless network system, which is not limited in the embodiments of the present invention. The network node may be an access control device, for example, may be a base station controller (BSC) in GSM or CDMA, or may be a radio network controller (RNC) in WCDMA, or may be an access controller (AC) in a WLAN, or may be another network element that has a similar function, which is not limited in the embodiments of the present invention.

It should be noted that a link control node mentioned in the embodiments of the present invention refers to a unit, on an access network side, configured to manage and control MPTCP data transmission. A location at which the link control node is deployed is not limited. The link control node may be individually deployed, or deployed together with a network management system, an access control device, and an access device. In other words, the control node may be a standalone device, or may be deployed on another communications device, which is not limited in the embodiments of the present invention.

For example, the link control node may serve as a control unit and be deployed on the foregoing BSC, RNC, access controller, or another access control device. Alternatively, the link control node may serve as a control unit and be deployed on the foregoing BTS, NodeB, e-NodeB, access point, or another access device. For another example, the link control node may be an individually deployed device, and can exchange information with the foregoing base station device or base station controller that serves as the network node.

User equipment (UE) mentioned in the embodiments of the present invention may be user equipment that accesses an access network in a wireless manner to perform data transmission, such as a mobile phone, a personal computer that has a wireless communication function, or the like. In the embodiments of the present invention, an access user refers to a logical object, in an access network, corresponding to a user equipment that successfully accesses a communications network by using the access network. When a user equipment that serves as a party of an MPTCP connection accesses a communications network and performs actual communication, the user equipment may be considered as an access user. Particularly, a same user equipment that accesses different communications networks and has TCP subflows in different communications networks corresponds to different access users in the corresponding communications networks, and has respective user identities in the corresponding communications networks. For example, a user equipment has a radio link in a 3GPP network, and the user equipment corresponds to an access user in the 3GPP network. The access user may be identified by using a method of combining an international mobile subscriber identity (IMSI), or a globally unique temporary identity (GUTI), or a global cell identity (GCI) and a user identity in a cell, or another method. The user equipment has a radio link in a WLAN network, and the user equipment corresponds to an access user in the WLAN network. The access user may be identified by using a method of combining a MAC address or an access point ID and an Internet Protocol (IP) address, or combining an access controller ID and an IP address, or combining a service set identifier (SSID) and an IP address.

It should be noted that the access network described in the embodiments of the present invention includes a radio access network (RAN) that is constituted by devices such as a BTS and a BSC, or a NodeB or an RNC, or an e-NodeB, and also includes a broadband access network that is constituted by devices such as an access point and an access controller. The access controller may be integrated with the RNC. That is, functions of the access controller may be integrated into the RNC and the RNC communicates with the access point.

FIG. 1 is a schematic diagram of an MPTCP protocol stack. For a standard TCP, the MPTCP protocol stack mainly classifies TCP layers into an MPTCP layer and a TCP subflow layer. The MPTCP protocol stack implements concurrent data transmission in the following manners, including: establishing multiple TCP subflows, equivalent to establishing multiple TCP links; processing such as offloading or converging, by the MPTCP layer, data for the multiple TCP subflows. The TCP subflow is a TCP data flow that is transmitted on a particular transmission path. A transmission path refers to a channel between two communication parties of an MPTCP connection, and may be identified by corresponding addresses of one party and the other party of the two communication parties, such as corresponding IP addresses of the two communication parties, and/or corresponding port numbers of the two communication parties. Each TCP subflow has a corresponding transmission path. A TCP subflow and an MPTCP connection to which the TCP subflow belongs are associated by using a token. The token is an identifier of the MPTCP connection and is only unique locally in one communication party, that is, a token is generated by each of parties that initiate and respond to an initial MPTCP connection establishment process. The tokens may be considered as MPTCP connection IDs.

According to a sequence of establishing TCP subflows, a TCP subflow that is established in the initial MPTCP connection establishment process is referred to as an MPTCP primary link, and a TCP subflow that is established in a subflow joining process is referred to as an MPTCP sublink. Each MPTCP connection includes one MPTCP primary link and at least one MPTCP sublink. When only the MPTCP primary link exists, the MPTCP primary link is equivalent to a common TCP link.

MPTCP is an end-to-end protocol. Therefore, two communication parties need to exchange control signaling to complete functions such as establishing an initial MPTCP connection, and adding or deleting an MPTCP sublink. The control signaling is transmitted by means of a TCP option field. That is, a special value is added in the option field.

Figure 2:
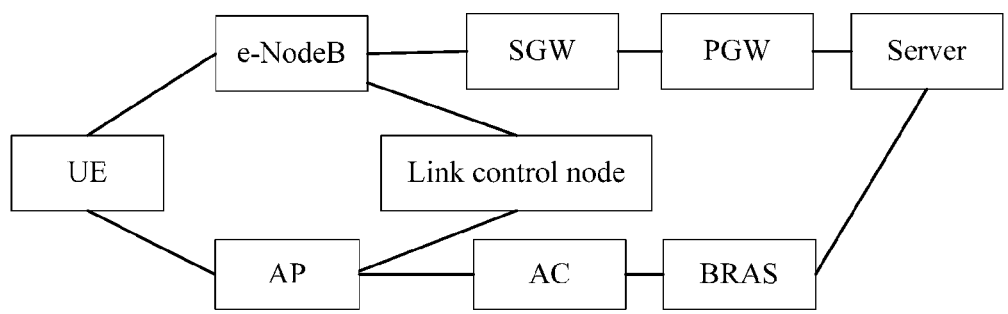
FIG. 2 is a schematic diagram of an application scenario of an embodiment of the present invention.

FIG. 2 is a schematic diagram of an application scenario of an embodiment of the present invention. As shown in FIG. 2, an MPTCP connection between a user equipment and a server has two TCP subflows. One TCP subflow is transmitted on an LTE link. The LTE link includes an e-NodeB, which is an access network side node, an independent service gateway (SGW), which is a core network side node, and a packet data network gateway (PGW). The other TCP subflow is transmitted on a Wi-Fi link. The Wi-Fi link includes network nodes AP and AC on an access network side, and a broadband remote access server (BRAS), which is a core network side node. A link control node provided in this embodiment of the present invention shown in FIG. 2 may be individually disposed, and separately has a link connection to the e-NodeB and to the access controller, to exchange information. The e-NodeB and the access point may separately forward, to the link control node, a TCP data packet that carries MPTCP link information. The link control node obtains related address information and a current status of the MPTCP link according to the MPTCP link information. In addition, the link control node may determine an adjustment policy for an MPTCP sublink according to an operator policy, or a radio resource status of a network node which an access user accesses, or a status of a communication link on which an access user is located, or another condition.

Figure 3:
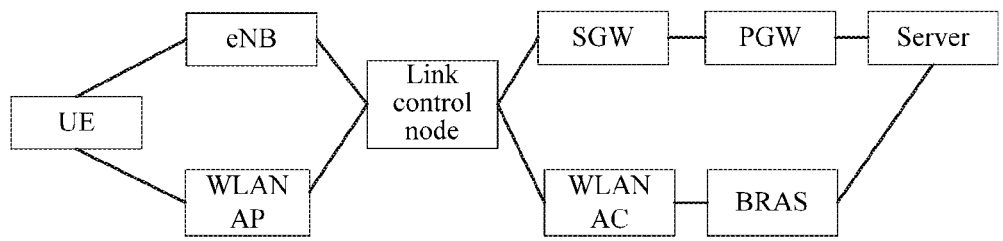
FIG. 3 is a schematic diagram of another application scenario of an embodiment of the present invention.

FIG. 3 is a schematic diagram of another application scenario of an embodiment of the present invention. A difference between the application scenario shown in FIG. 3 and the application scenario shown in FIG. 2 is that a link control node is deployed on a transmission channel on an MPTCP link between a user equipment and a server. The link control node can directly listen to and capture signaling or data transmitted on the MPTCP link. Deployment of other apparatuses is similar to the application scenario shown in FIG. 2, and details are not described herein.

It should be understood that air links that bear TCP subflows may be of a same type or different types. It is assumed that an MPTCP connection includes two TCP subflows. The two TCP subflows may both be established on an LTE link. Alternatively, one TCP subflow is established on an LTE link, and the other TCP subflow is established on a Wi-Fi link. A quantity of TCP subflows included by a same MPTCP connection and a link type are not specially limited in this embodiment of the present invention and may be determined according to an actual network running requirement.

Figure 4:
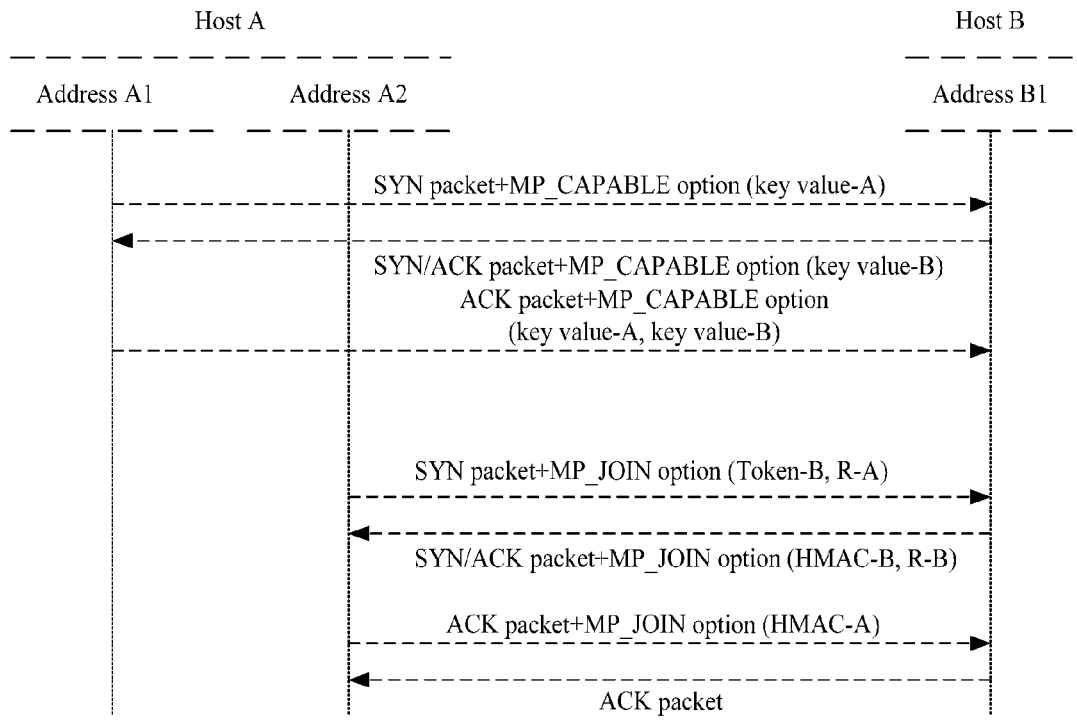
FIG. 4 is a signaling flowchart of an initial MPTCP connection establishment process and a TCP subflow creation process.

FIG. 4 is a signaling flowchart of an initial MPTCP connection establishment process and a TCP subflow creation process. The initial MPTCP connection establishment process includes: establishing a first TCP subflow that belongs to the MPTCP connection, and establishing the MPTCP connection after three handshake processes. This process differs from a process of establishing a common TCP connection in that a TCP SYN packet, an SYN/ACK packet, and an ACK packet carry an MP-CAPABLE option, and this option carries a 64-bit key value (key).

After the initial MPTCP connection establishment process is completed, either party of the MPTCP connection may use an address that is not used by the party and an address that is not used by the other party to create a TCP subflow. The address that is not used by the party and the address that is not used by the other party are referred to as a pair of available addresses. As shown in FIG. 4, a TCP subflow A2<->B1 is created between a host A and a host B. A2 is an available address of the host A and B1 is an available address of the host B. An MP_JOIN option is carried in the TCP subflow creation process to complete a signal exchange process of the latter four steps in FIG. 4. The MP_JOIN option carried in a TCP SYN packet includes a 32-bit token, a 32-bit random number, an ADDRESS_ID, and a backup identifier. A Token-B is a 32-bit value generated by a party that initiates the subflow joining process by using a 64-bit key value of a party that responds to the process and by using an encryption algorithm, such as a hash algorithm. The party that initiates the subflow joining process identifies, by carrying this parameter in the TCP SYN packet, which MPTCP connection the subflow expects to join. A 32-bit random number R-A carried in the TCP SYN packet by the party that initiates the subflow joining process and a 32-bit random number R-B carried in an SYN/ACK packet by the party that responds to the subflow joining process are used to further ensure security of the subflow creation process. The ADDRESS_ID is only valid and unique locally in one communication party. An ADDRESS_ID carried in the TCP SYN packet by the party that initiates the subflow joining process is used to identify an IP address, in the current newly created TCP subflow, used by the party that initiates the subflow joining process. An ADDRESS_ID carried in the SYN/ACK packet by the party that responds to the subflow joining process is used to identify an IP address, in the current newly created TCP subflow, used by the party that responds to the subflow joining process. The backup identifier bit is used to indicate whether a party sending the information expects the other party to use the TCP subflow as backup. If the backup identifier bit is set to 1, the party sending the information requests the other party to send, only when there is no available subflow, that is, a backup identifier bit of the subflow is 0, data on a backup subflow whose backup identifier bit is 1. For example, a backup identifier bit carried in an SYN packet by the party host A that initiates the TCP subflow is used to indicate whether the host A expects the host B to use the TCP subflow as backup. A backup identifier bit carried in an SYN/ACK packet by the party host B that responds to the TCP subflow is used to indicate whether the host B expects the host A to use the TCP subflow as backup.

An embodiment of the present invention provides a link control node. The link control node may be located on an access network side and applicable to the application scenario shown in FIG. 2 or FIG. 3.

Figure 5:
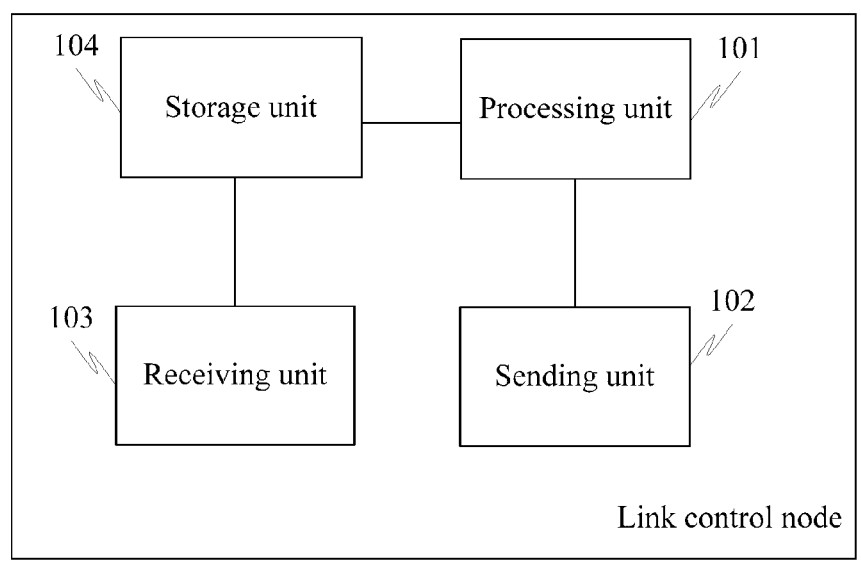
FIG. 5 is a schematic block diagram of a link control node according to an embodiment of the present invention.

FIG. 5 shows a schematic block diagram of the link control node. The link control node includes a processing unit 101 and a sending unit 102.

The processing unit 101 is configured to identify, according to Multipath Transmission Control Protocol (MPTCP) link information, an MPTCP sublink that belongs to an MPTCP connection, determine, from the MPTCP sublink, a first MPTCP sublink on which link control needs to be performed, and determine an adjustment manner applicable to the first MPTCP sublink.

The sending unit 102 is configured to send an indication message to two communication parties that use the MPTCP connection, where the indication message is used to instruct the two communication parties to perform the adjustment manner.

The two communication parties of the MPTCP connection may be communications devices at two ends in an uplink or downlink data transmission process over an air interface. Any party may initiate or respond to processes related to the MPTCP connection. The related processes include: an initial MPTCP connection establishment process, a TCP subflow joining process, a TCP subflow deletion process, a TCP subflow priority update process, and the like. For example, a user equipment that accesses a radio access point initiates an initial MPTCP connection establishment process, a server on a core network side responds to the process. The user equipment and the server are two communication parties of an MPTCP connection. Similarly, the server may initiate the initial MPTCP connection establishment process and the user equipment responds to the process.

It should be noted that a party that initiates or responds to the initial MPTCP connection establishment process is a party that initiates or responds to an MPTCP primary link. A party that initiates or responds to the TCP subflow joining process is a party that initiates or responds to an MPTCP sublink. There is no correspondence between sending parties or between receiving parties in a subsequent data transmission process. For example, both the party that initiates and the party that responds to the initial MPTCP connection establishment process may serve as the party that initiates the TCP subflow joining process. Either the party that initiates or the party that responds to the initial MPTCP connection establishment process, or either the party that initiates or the party that responds to the TCP subflow joining process may send data to the other party.

The MPTCP link information refers to information related to an MPTCP connection, and may include address information of an MPTCP primary link and/or an MPTCP sublink. For example, the address information includes IP addresses, port numbers, and tokens of parties that initiate and respond to the MPTCP primary link, and IP addresses and port numbers of parties that initiate and respond to the MPTCP sublink. One MPTCP connection may be uniquely identified according to the IP addresses, the port numbers, and the tokens of the parties of the MPTCP primary link. One TCP subflow may be uniquely identified by IP addresses and port numbers of parties of an MPTCP sublink. The TCP subflow, namely the MPTCP sublink, may be a TCP subflow that is not completely established but the parties of the TCP subflow joining process have exchanged some signaling, or a TCP subflow that has been established.

The MPTCP link information may further include status information of the MPTCP primary link and/or the MPTCP sublink. The status information is used to indicate a current status of an established MPTCP sublink. For example, The MPTCP link information may be information indicating whether the primary link or the sublink is available or unavailable, link priority information indicating whether the MPTCP sublink is a secondary link, or the like.

The processing unit 101 may be configured to obtain MPTCP link information of a to-be-identified MPTCP sublink, match the to-be-identified MPTCP sublink with an MPTCP primary link according to MPTCP link information of the MPTCP primary link, and determine a to-be-identified MPTCP sublink that matches the MPTCP primary link as the identified MPTCP sublink.

Optionally, the processing unit 101 may parse signaling that is exchanged in a communication process of the two communication parties that use the MPTCP connection, to obtain the MPTCP link information of the to-be-identified MPTCP sublink, for example, in the TCP subflow joining process.

Similarly, the processing unit 101 may use signaling that is exchanged by the two communication parties in the initial MPTCP connection establishment process to obtain the MPTCP link information of the MPTCP primary link.

In one embodiment of the present invention, the link control node may directly listen to and parse related signaling in the initial MPTCP connection establishment process and the TCP subflow joining process, to obtain MPTCP link information of an MPTCP primary link and/or a sublink of any MPTCP connection that passes by means of the link control node. This embodiment may be applicable to the application scenario shown in FIG. 2.

In another embodiment of the present invention, the link control node may receive, by using a receiving unit 103, an MPTCP connection message sent by a network node. The MPTCP connection message includes MPTCP link information of an MPTCP primary link and to-be-identified MPTCP sublink. The network node is located on a transmission channel between two communication parties of an MPTCP connection. This embodiment may be applicable to the application scenario shown in FIG. 3.

In this embodiment, the network node may identify a status of an MPTCP connection of an access user, to generate an MPTCP connection message corresponding to the current status of the MPTCP connection. Specifically, the network node may parse a TCP data packet sent and received by the access user and identify which access user is an MPTCP user by using a special field in the TCP data packet. The network node obtains signaling, of the MPTCP connection, sent and received by the MPTCP user, parses the signaling, and forms a corresponding MPTCP connection message and sends it to the link control node. Optionally, the network node may analyze a TCP data packet of a current access user. If finding that the TCP data packet includes signaling of the MPTCP connection, the network node copies the TCP data packet and sends it to the link control node. The processing unit 101 parses the TCP data packet and obtains corresponding MPTCP link information from the signaling in the TCP data packet.

The signaling of the MPTCP connection includes all signaling related to the MPTCP connection, such as MP_CAPABLE, MP_JOIN, ADD_ADDR, REMOVE_ADDR, MP_FAIL, MP_PRIO, MP_FASTCLOSE, and another option; and all signaling related to a TCP subflow, such as SYN (Synchronous), SYN/ACK (Acknowledgement), FIN (Final), FIN/ACK, RST (Reset), and another special TCP data packet.

Optionally, the receiving unit 103 may receive multiple MPTCP connection messages of different types. The multiple MPTCP connection messages are reported by the network node and are of multiple different TCP subflows that belong to a same MPTCP connection. For example, MPTCP connection messages, of at least one TCP subflow passing by means of the network node, that are reported by a BTS, a NodeB, and an access point and received at the same time. Optionally, the network node may be a base station device. A communication link may be established between the link control node and a base station controller that manages different network nodes. The communication link is used to transmit measurement information and control information. For example, it is assumed that the link control node is integrated into an RNC. The NodeB may directly report an MPTCP connection message that is parsed by the NodeB to the RNC. The BTS or the access point may report their respectively obtained MPTCP connection message to a corresponding BSC or access controller. The BSC or the access controller forwards the received MPTCP connection message to the RNC according to a link relationship between the BSC or access controller and the RNC. The RNC performs management on the MPTCP connection. Optionally, a communication link may be directly established between the network node and the link control node. The network node may directly report a related message to the link control node without forwarding by a related control device. In addition, if the network node and the link control node are integrated into a network device, for example, an e-NodeB, similar to the foregoing scenario, a communication link needs to be established only between the e-NodeB and another network device at a level corresponding to the e-NodeB, to exchange information. Details are not described herein.

Optionally, in another embodiment of the present invention, the link control node may further include a storage unit 104. The storage unit 104 is configured to store an MPTCP link information table, where the MPTCP link information table includes the MPTCP link information of the MPTCP primary link.

The processing unit 101 may be specifically configured to add the MPTCP link information of the MPTCP sublink that matches the MPTCP primary link to the MPTCP link information table, and update the MPTCP link information table when a current status of the MPTCP sublink or a current status of the MPTCP primary link changes.

Optionally, the MPTCP link information table may include MPTCP link information of a same MPTCP connection, or MPTCP link information of multiple MPTCP connections. The processing unit 101 may manage, by an address of an MPTCP connection, an MPTCP primary link and a sublink of each MPTCP connection in an entire system.

Optionally, the processing unit 101 may be specifically configured to determine, according to a link adjustment policy, the first MPTCP sublink and the adjustment manner applicable to the first MPTCP sublink. The link adjustment policy may include first MPTCP link information that is used to identify the first MPTCP sublink, and command information that is used to indicate the adjustment manner.

Specifically, the processing unit 101 may search in the identified MPTCP sublink according to the first MPTCP link information that is used to identify the first MPTCP sublink and that is included in the link adjustment policy, and use an MPTCP sublink whose MPTCP link information is the same as the first MPTCP link information as the first MPTCP sublink. The link adjustment policy may include a specific processing manner of an MPTCP sublink on which link control is determined and needs to be performed.

Optionally, the link adjustment policy may be determined based on at least one condition of an operator management and control policy, a radio resource status of a network node corresponding to the MPTCP sublink, or a link status of the MPTCP sublink.

The operator management and control policy includes items that ensure system load balancing, link resource utilization, and an accounting policy, and that represent an operator's management and control tendency on an entire network.

A scenario of concurrent LTE and Wi-Fi data is used for description. A congestion control algorithm is defined in the MPTCP protocol: Round trip time (RTT) of data and a packet loss rate are used as a basis for data offloading and scheduling. If a user equipment that is located at the edge of an LTE network has a communication link of poor quality, an operator may tend to transmit more data on a Wi-Fi link with higher spectral efficiency, but the communication link quality and the spectral efficiency do not have a direct correspondence with the RTT or the packet loss rate of the link. Therefore, using only objective factors RTT and a packet loss rate for an LTE link and the Wi-Fi link as a basis for data offloading and scheduling cannot ensure that data can be correctly offloaded to the Wi-Fi link. For another example, considering a categorized accounting reason, the operator may expect the user equipment to transmit data on the LTE link as much as possible, but using the objective factors RTT and packet loss rate as the basis for offloading, the operator cannot control how to allocate data to the two links. The link adjustment policy is defined to adjust the status of the MPTCP sublink and to actively change a transmission path of data. This may enable a transmission path of service data to achieve the operator's management and control purpose.

The operator policy may be directly configured for the link control node, or delivered by another network element, for example, set and delivered by a control device in a core network. This embodiment of the present invention sets no special limitation thereto.

Optionally, the receiving unit 103 may be configured to receive a measurement report that is reported by the network node corresponding to the MPTCP sublink, and determine the link adjustment policy according to the link quality status of the MPTCP sublink and/or the radio resource status of the network node corresponding to the MPTCP sublink that are or is indicated by the measurement report, and also according to the operator management and control policy.

Optionally, the measurement report may be a measurement report for a network node which a user equipment accesses and that serves as a communication party of an MPTCP connection. Contents in the report may include but not limited to the following information: a radio access type, an identifier of a radio access point, and a resource status of the radio access point, for example, system load information.

Optionally, the measurement report may be a measurement report directly for an access user, that is a user equipment. Contents in the report may include but not limited to the following information: a radio access type, an identifier of a radio access point, a globally unique identifier of the access user, and air link information of the user equipment, such as link quality and user distribution status. The user distribution status is information about whether a user is located at a center of a cell or at the edge of a cell.

The measurement report may be periodically reported or triggered by an event, which is not limited in this embodiment of the present invention. Optionally, a measurement report for a network node may be reported only when the network node has a TCP subflow related to an MPTCP connection, or a measurement report for an access user may be reported only when the access user has a TCP subflow related to an MPTCP connection. This may reduce frequency of reporting a measurement report.

Optionally, that the processing unit 101 may be configured to determine, from the MPTCP sublink, the first MPTCP sublink on which link control needs to be performed includes:

determining whether a radio resource status of the network node corresponding to the MPTCP sublink meets a first preset condition, and determining, from an MPTCP sublink corresponding to a network node that does not meet the first preset condition and according to an operator management and control policy, at least one MPTCP sublink corresponding to the network node as the first MPTCP sublink; or determining whether a link quality status of the MPTCP sublink meets a preset second condition, and determining, from an MPTCP sublink that does not meet the preset second condition and according to an operator management and control policy, at least one MPTCP sublink as the first MPTCP sublink.

Optionally, the processing unit 101 may be configured to calculate a parameter value that represents the radio resource status of the network node corresponding to the MPTCP sublink, and/or a parameter value that represents the link quality status of the MPTCP sublink. For example, the processing unit 101 may calculate a value of a parameter that represents link quality, such as a channel quality indicator (CQI), a reference signal received power (RSRP), or the like. For a specific calculation process, refer to related contents in the prior art. Details are not described in this embodiment of the present invention.

The first preset condition and the second preset condition may be determined according to a network operation requirement and adjusted according to a network running status in a device working process. This embodiment of the present invention sets no special limitation thereto.

It may be understood that a manner of expressing the first MPTCP sublink is to distinguish the first MPTCP sublink from other MPTCP sublinks on which processing is not performed. The sequence numbers first, second, and third described in this embodiment of the present invention are not sequence dependent and should not be construed as a limitation on this embodiment of the present invention.

It may be understood that descriptions of how the processing unit 101 determines the first MPTCP sublink on which link control needs to be performed and determines the adjustment manner applicable to the first MPTCP sublink may be considered as a manner in which the link control node determines the link adjustment policy. That is, the link control node first determines the link adjustment policy according to the foregoing method and performs the link adjustment policy. Alternatively, the link control node directly performs the foregoing steps without first setting the link adjustment policy. This embodiment of the present invention sets no special limitation thereto.

Optionally, the link control node may determine and perform the link adjustment policy. Alternatively, the network node may determine the link adjustment policy and send it to the link control node, and the link control node determines, according to the current status of the MPTCP sublink in the stored MPTCP link information, a specific manner of performing the policy, for example, a manner of sending which signaling to adjust an already selected link. Optionally, the link control node may receive an initial policy and a link status and/or a radio resource status that are reported by the network node, calculate the link status or the radio resource status, and make the best choice according to the link status or the radio resource status and the initial policy reported by the network node.

Optionally, the link control node may send information related to the MPTCP connection to the network node, so that the network node can determine the policy. When determining that a corresponding MPTCP sublink can be adjusted, a network node sends a link adjustment policy to the link control node, and the receiving unit 103 receives the link adjustment policy.

Optionally, after performing the link adjustment policy, the link control node may further feed back an actual policy performing status to the network node, so that the network node can set a subsequent policy.

It should be noted that a format and contents of the link adjustment policy are not limited, and may include an address, status information, and a specific processing manner of an MPTCP link. For example, a semantic policy may be used, including address: an IP address of an MPTCP sublink; status: a port has a link of poor performance; processing manner: need to be deleted. Alternatively, address: an IP address of an MPTCP sublink; status: a port has a link of a lower priority; processing manner: the priority of the link may be increased.

It may be learned that the operator management and control policy may be randomly combined with the radio resource status of the network node corresponding to the MPTCP sublink, the link quality status of the MPTCP sublink, and another condition, or is separately used as a basis for setting the link adjustment policy. In addition, how to determine a target sublink and its corresponding adjustment manner is not limited to the foregoing three conditions. An appropriate reference may be selected according to a system running requirement as the basis for setting the policy and a corresponding processing method. This embodiment of the present invention sets no special limitation thereto.

After obtaining the link adjustment policy, the link control node obtains the address information carried in the link adjustment policy, identifies a to-be-processed MPTCP sublink, searches in the MPTCP link information table to find an association between the to-be-processed MPTCP sublink and the MPTCP primary link, determines a status of the MPTCP sublink, and processes the MPTCP sublink according to the processing manner included in the link adjustment policy. The association includes information indicating that a current MPTCP sublink available for a user equipment to perform data communication belongs to which MPTCP connection, information about which network node the user equipment uses to access an access network, or the like.

Optionally, the processing unit 101 may be specifically configured to determine, according to the command information that indicates the adjustment manner and that is included in the link adjustment policy, whether a current status of the first MPTCP sublink is applicable to the adjustment manner.

The sending unit 102 may be specifically configured to send signaling that indicates the adjustment manner to the two communication parties of the MPTCP connection for the first MPTCP sublink applicable to the adjustment manner.

Optionally, the adjustment manner may include stopping establishment of the first MPTCP sublink, deleting the first MPTCP sublink, or adjusting a priority of the first MPTCP sublink. The processing unit 101 may instruct, by means of signaling, the two communication parties to adjust the first MPTCP sublink.

Specifically, when the radio resource status of the network node and/or the link quality status of the MPTCP sublink corresponding to the network node indicate or indicates that a load of the network node exceeds a first preset threshold, the processing unit 101 may be configured to determine that the adjustment manner is stopping the first MPTCP sublink from completing the TCP subflow joining process.

Optionally, the two communication parties may be instructed in the following manners to stop the establishment of the first MPTCP sublink:

Manner 1: The link control node detects that a TCP data packet includes an MP_JOIN option, which indicates that an MPTCP sublink is established, sends a TCP RST packet or a TCP FIN packet to an IP address and a port of any party in a sublink table, and sets a sending source address and a port to an IP address and a port of the other party of the MPTCP sublink. This manner may be applicable to the application scenario shown in FIG. 2 or FIG. 3.

Manner 2: The link control node monitors four handshake sub-processes in the TCP subflow joining process, randomly change a special field, such as HMAC, or Token in the TCP data packet in the second, third, and fourth sub-processes, so that the TCP subflow joining process fails and the MPTCP sublink restores to a common TCP link. This manner is applicable to the application scenario shown in FIG. 3.

A policy of stopping establishment of multiple TCP subflows may be usually used to prevent system performance from further deteriorating when an operator's network is heavily loaded. This is usually applicable to a scenario in which a MPTCP link has not been established for data transmission. In this case, the link control node has not saved a complete information table including the MPTCP primary link and the sublink. Therefore, the link control node does not need to update the MPTCP link information table after the policy is completed.

Specifically, when the link quality status of the MPTCP sublink indicates that link performance of the first MPTCP sublink is lower than a second preset threshold, and a current status of the first MPTCP sublink indicates that the first MPTCP sublink is available, the processing unit 101 may be configured to determine that the adjustment manner is deleting the first MPTCP sublink.

Optionally, the link control node instructs, in the following manners, the two communication parties to delete the first MPTCP sublink:

Manner 1: The processing unit 101 instructs the sending unit 102 to send a TCP RST packet or a TCP FIN packet to any party in the MPTCP link information table, and to set a sending source address and a port number to an IP address and a port of the other party of the any party that receives the TCP RST packet or the TCP FIN packet. That is, the link control node replaces the other party to initiate a TCP subflow abnormal exit process or a TCP subflow stopping process. In this way, a corresponding MPTCP sublink may be deleted. This manner may be applicable to the application scenario shown in FIG. 2 or FIG. 3.

Manner 2: The processing unit 101 detects that a party of an MPTCP sublink on which link adjustment needs to be performed sends a TCP data packet to the other party, and changes a key field, such as DSS, in the TCP data packet. The other party fails to verify the TCP data packet. Then, the other party sends a TCP RST packet to the party to initiate a TCP subflow abnormal exit process. In this way, a corresponding MPTCP sublink may be deleted. This manner is applicable to the application scenario shown in FIG. 3.

A case in which link performance deteriorates because a cell is heavily loaded may be alleviated by deleting the MPTCP sublink. All MPTCP sublinks belonging to an MPTCP connection may be deleted and only an MPTCP primary link is retained depending on a system load status and an operation requirement. This is equivalent to that an MPTCP connection changes to a common TCP connection. The link adjustment policy is usually applicable to a scenario in which multiple MPTCP links have been established for data transmission. In this case, the link control node should have saved complete information about the MPTCP primary link and the sublink in the MPTCP link information table. After deleting the MPTCP sublink, the processing unit 101 may correspondingly update the MPTCP link information table.

Specifically, when the link quality status of the MPTCP sublink indicates that link performance of the first MPTCP sublink is higher than a third preset threshold, and a current status of the first MPTCP sublink indicates that the first MPTCP sublink is a secondary link, the processing unit 101 may be configured to determine that the adjustment manner is increasing a priority of the first MPTCP sublink.

Optionally, that the two communication parties are instructed to adjust a priority of the first MPTCP sublink includes: increasing the priority of the MPTCP sublink. This process specifically includes: searching for a link status of an available sublink in the MPTCP link information table, when a sublink of a backup priority exists, sending, to a party that initiates the sublink, a TCP data packet that includes an MP_PRIO option carrying a Change Subflow Priority command, and setting a Backup identifier bit of the sublink to 0, to activate the current sublink. Correspondingly, the link adjustment policy may include information about increasing a priority of one or multiple MPTCP sublinks. Similarly, a priority of an MPTCP sublink may be decreased. The sublink is set to a secondary link by setting a Backup identifier bit of the sublink to 1.

A policy of changing a priority of an MPTCP sublink is usually used to alleviate a case in which a single user of an operator has a lower priority. This is usually applicable to a scenario in which multiple MPTCP links have been established for transmission. In this case, the link control node saves complete information about the MPTCP primary link and the sublink. After updating the priority of the MPTCP sublink, the processing unit 101 may correspondingly update the MPTCP link information table.

The first preset threshold, the second preset threshold, and the third preset threshold may be determined according to a network operation requirement and adjusted according to a network running status in a device working process. This embodiment of the present invention sets no special limitation thereto.

It should be noted that, firstly, an action of performing a link adjustment policy by an information transmission control node is only for items in an MPTCP link information table. That is, processing is performed according to the policy based on status of an MPTCP link. This does not affect a common TCP link. Secondly, processing is performed according to the policy on a sublink that meets an adjustment condition. For a to-be-processed link that is specified in the policy, if it is found, by retrieving in the MPTCP link information table, that the link is a primary link of an MPTCP connection, in this case the link control node does not perform processing. Therefore, normal service running of a user is not affected.

It can be understood that the adjustment manner of the MPTCP sublink is exemplary. There may be another link adjustment manner for an actual status of an MPTCP sublink and different system running requirements. This embodiment of the present invention sets no special limitation thereto.

In another embodiment of the present invention, an example is provided to describe a manner and a process in which the processing unit 101 maintains the MPTCP link information table. This process includes a process of obtaining information corresponding to one MPTCP primary link and one MPTCP sublink, and a process of establishing a link information table. It can be understood that establishing and maintaining the MPTCP link information table are not merely limited to the following unique manner, which is not specially limited in this embodiment of the present invention.

In an initial state, contents of the MPTCP link information table may be shown in Table 1:

TABLE 1

| | |
|---|---|
| MPTCP primary link status | Unavailable |
| IP addresses, port numbers, and other information of two communication parties of the MPTCP primary link | Null |
| MPTCP sublink status | Unavailable |
| IP addresses, port numbers, and other information of two communication parties of the MPTCP sublink | Null |

The initial state refers to that an MPTCP connection is not established, but two communication parties using the MPTCP protocol may initiate an initial MPTCP connection establishment process at any time.

Specifically, the link control node parses a TCP data packet that is currently transmitted by the two communication parties and obtained by means of listening or forwarded by the network node. If signaling related to the initial MPTCP connection establishment process is found in the TCP data packet, for example, if the processing unit 101 obtains by means of parsing that the TCP data packet is a TCP SYN packet and an OPTION field includes an MP_CAPABLE option, the processing unit 101 may calculate a token of a party that initiates the initial MPTCP connection establishment process. This process includes: The processing unit 101 selects a token calculation algorithm according to crypto algorithm negotiation bits in the OPTION field in the TCP data packet, and uses a Key in the OPTION field in the current TCP data packet to calculate the token of the party that initiates the process. For example, an HMAC-SHA1 algorithm supported in an existing protocol is used. The processing unit 101 retrieves in the MPTCP link information table according to the IP addresses and port numbers of the two communication parties that are carried in the current TCP packet and obtained by means of parsing, and the calculated token of the party that initiates the process. If a matched entry is retrieved, the processing unit 101 does not update the information table. If the matched entry cannot be retrieved, the processing unit 101 adds the IP addresses and port numbers of the two communication parties and the token of the party that initiates the process to the MPTCP link information table. The matched entry being retrieved indicates that the initial MPTCP connection establishment process has been completed.

For another example, if the processing unit 101 obtains by means of parsing that the current TCP data packet is a TCP SYN/ACK packet and an OPTION field includes an MP_CAPABLE option, the processing unit 101 may calculate a token of a party that responds to the initial MPTCP connection establishment process. This process includes: The processing unit 101 first calculates a Key in the OPTION field in the TCP SYN/ACK packet as the token. A calculation process is similar to the process of calculating the token of the party that initiates the process. Details are not described herein. Then, The processing unit 101 substitutes an IP address and a port number of a party that initiates the MPTCP primary link and an IP address and a port number of a party that responds to the MPTCP primary link respectively, that is, the IP address of the party that initiates is equal to the IP address of the party that responds; the port number of the party that initiates is equal to a port number of a destination party; the IP address of the party that responds is equal to the IP address of the party that initiates; the port number of the destination party is equal to the port number of the party that initiates. The processing unit 101 retrieves in the MPTCP link information table by using address information that is obtained after the substitution and the calculated token. If a matched address is retrieved, the processing unit 101 adds the token to a token item of the party that responds to the MPTCP primary link.

For another example, if the processing unit 101 obtains by means of parsing that the current TCP data packet is a TCP ACK packet and an OPTION field includes an MP_CAPABLE option, the processing unit 101 may calculate tokens of two parties of an initial MPTCP connection according to a Key 1 and a Key 2 in the OPTION field. A calculation process is the same as the process described above. The processing unit 101 matches the tokens with separately calculated tokens of the two parties in the initial MPTCP connection establishment process. If matching succeeds, it indicates that the initial MPTCP connection has been established and the status of the MPTCP primary link may be marked as available.

The processing unit 101 parses the currently transmitted TCP data packet. If finding that the TCP data packet is a data packet related to the TCP subflow joining process, for example, finding that the current TCP data packet is a TCP SYN packet and an OPTION field includes an MP_JOIN option, the processing unit 101 retrieves in the MPTCP link information table according to a token that is calculated based on a key in the OPTION field. If the processing unit 101 obtains by means of retrieving that the token is the same as a token of a party that initiates an MPTCP primary link or a token of a party that responds to an MPTCP primary link, and a status of the MPTCP primary link is available, it indicates that a newly created TCP subflow in the TCP subflow joining process is associated with the MPTCP primary link, and the TCP subflow and the MPTCP primary link belong to a same MPTCP connection. Address information, such as IP addresses and port numbers of parties that initiate and respond to an MPTCP sublink, is updated for the same MPTCP primary link. At the same time, a link priority of the MPTCP sublink is updated according to a Backup identifier bit in the OPTION field. For another example, if the processing unit 101 finds that the current TCP data packet is a TCP ACK packet, and obtains by means of parsing that address information obtained after substitution in the current TCP data packet matches related information in the MPTCP link information table, and a status of an MPTCP primary link is available, it indicates that an MPTCP sublink has been established. The processing unit 101 updates a status of the MPTCP sublink to available in the MPTCP link information table.

The processing unit 101 parses the currently transmitted TCP data packet. If finding that the TCP data packet is in an MPTCP subflow stopping process, that is, a type of the current TCP data packet is four handshake sub-processes in a FIN process, the processing unit 101 separately retrieves in the MPTCP link information table according to the address information in the TCP data packet and the address information obtained after substitution. If finding by means of retrieving that the status of the MPTCP primary link is available, and the address information or the address information obtained after substitution matches address information of a sublink in the MPTCP link information table, the processing unit 101 deletes information related to the TCP sublink, including the address information and priority information, and updates the status of the MPTCP sublink to unavailable.

The processing unit 101 parses the currently transmitted TCP data packet. If finding that the TCP data packet is in an MPTCP primary link stopping process, that is, a type of the current TCP data packet is four handshake sub-processes in a DATA_FIN process, the processing unit 101 separately retrieves in the MPTCP link information table according to the address information in the TCP data packet and the address information obtained after substitution. If finding by means of retrieving that the status of the MPTCP primary link is available, and the address information or the address information obtained after substitution matches address information of an MPTCP primary link or address information of a sublink in the MPTCP link information table, the processing unit 101 sequentially searches for and deletes the following contents.

TABLE 2

An IP address of a party that initiates an MPTCP sublink
A port number of the party that initiates the MPTCP sublink
An IP address of a party that responds to the MPTCP sublink
A port number of the party that responds to the MPTCP sublink
A priority of the MPTCP sublink
An IP address of a party that initiates an MPTCP primary link
A port number of the party that initiates the MPTCP primary link
An IP address of a party that responds to the MPTCP primary link
A port number of the party that responds to the MPTCP primary link The processing unit 101 updates the statuses of the MPTCP sublink and the MPTCP primary link to unavailable at the same time.

The processing unit 101 parses the currently transmitted TCP data packet. If it is found that the TCP data packet is in an RST process indicating MPTCP sublink abnormal exit, for a processing process, refer to the subflow stopping process. Details are not described herein.

The processing unit 101 parses the currently transmitted TCP data packet. If it is found that the TCP data packet is in an MP_FASTCLOSE process indicating MPTCP primary link abnormal exit, for a processing process, refer to the MPTCP primary link stopping process. Details are not described herein.

The processing unit 101 parses the currently transmitted TCP data packet. If finding that the TCP data packet is in an MPTCP sublink priority adjustment process, the processing unit 101 separately retrieves in the MPTCP link information table according to the address information in the TCP data packet and the address information obtained after substitution. When finding by means of retrieving that the status of the MPTCP primary link is available, and the address information or the address information obtained after substitution matches address information of an MPTCP sublink in the MPTCP link information table, the processing unit 101 updates a priority of the MPTCP sublink to a current priority. The current priority is represented by a Backup identifier bit in the TCP data packet.

Figure 6:
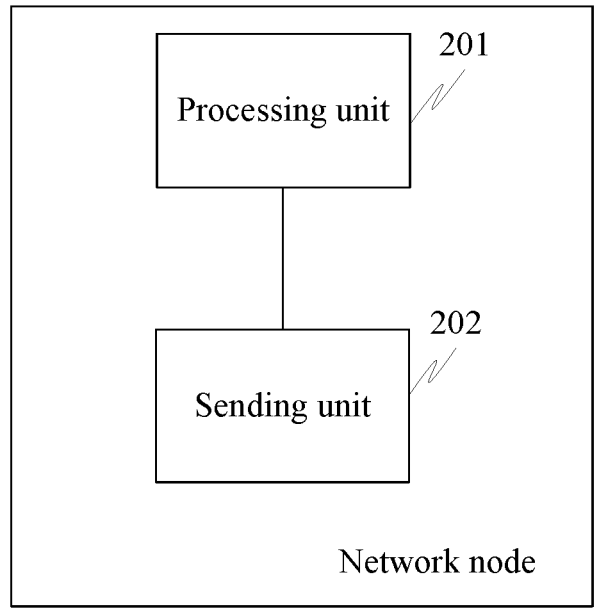
FIG. 6 is a schematic block diagram of a network node according to an embodiment of the present invention.

An embodiment of the present invention provides a network node. The network node is located on a transmission path of an MPTCP sublink and is configured to support data communication between two communication parties that use an MPTCP connection. FIG. 6 shows a block diagram of the network node. The network node includes a processing unit 201 and a sending unit 202.

The processing unit 201 may be configured to determine a link adjustment policy, where the link adjustment policy is used to instruct to determine, from an MPTCP sublink that corresponds to the network node and belongs to an MPTCP connection, a first MPTCP sublink on which link control needs to be performed, and determine an adjustment manner applicable to the first MPTCP sublink.

The sending unit 202 may be configured to send the link adjustment policy to a link control node.

The link control node and the network node may be two standalone apparatuses between which direct or indirect communication exists, or are located in an entity network element, such as a base station. This embodiment of the present invention sets no special limitation thereto.

The link adjustment policy includes first MPTCP link information that is used to identify the first MPTCP sublink, and command information that is used to indicate the adjustment manner.

For specific contents of the link adjustment policy and a method of determining the policy, refer to related descriptions in the embodiment shown in FIG. 4. The method is similar to a process in which the link control node determines the first MPTCP sublink and its corresponding adjustment manner. Details are not described herein.

The first MPTCP link information may include address information of the first MPTCP sublink, where the address information includes IP addresses and port numbers of the two communication parties. Optionally, the first MPTCP link information may further include status information that represents a current status of the first MPTCP sublink, where the status information includes information that indicates whether a link is available or unavailable, and information that indicates a link priority.

Optionally, the sending unit 202 may be further configured to report a measurement report to the link control node. The measurement report is used to indicate a link status of a communication link of the multiple TCP subflows and/or a radio resource status of a network node corresponding to the multiple TCP subflows. The link control node may parse the measurement report to determine the link adjustment policy.

Optionally, the processing unit 201 may be further configured to parse signaling that is exchanged in a communication process of the two communication parties that use the MPTCP connection, to obtain MPTCP link information of the MPTCP sublink.

Specifically, the network node may identify an MPTCP connection status of an access user by using the processing unit 201, generate an MPTCP connection message corresponding to the MPTCP connection status, and report the MPTCP connection message to the link control node. The MPTCP connection message carries the MPTCP link information of the MPTCP sublink of the network node. The link control node may identify current statuses of an MPTCP primary link and the MPTCP sublink according to the MPTCP connection message, select the first MPTCP sublink suitable for link control, and determine the adjustment manner applicable to the first MPTCP sublink.

With the link control node and the network node provided in this embodiment of the present invention, a system running requirement may be determined according to conditions such as an operator management and control policy, a radio resource status of an access point, and a link quality status, to select an MPTCP sublink suitable for link adjustment and to determine its adjustment manner. By adding centralized management and control measures on MPTCP connections, a data transmission process on each MPTCP sublink can be performed on an expected communication link. Therefore, radio resources can be appropriately allocated, and system performance can be improved. Furthermore, a link control node provided in the embodiments of the present invention may be flexibly disposed on an access network side, to effectively manage and control an MPTCP connection.

Figure 7:
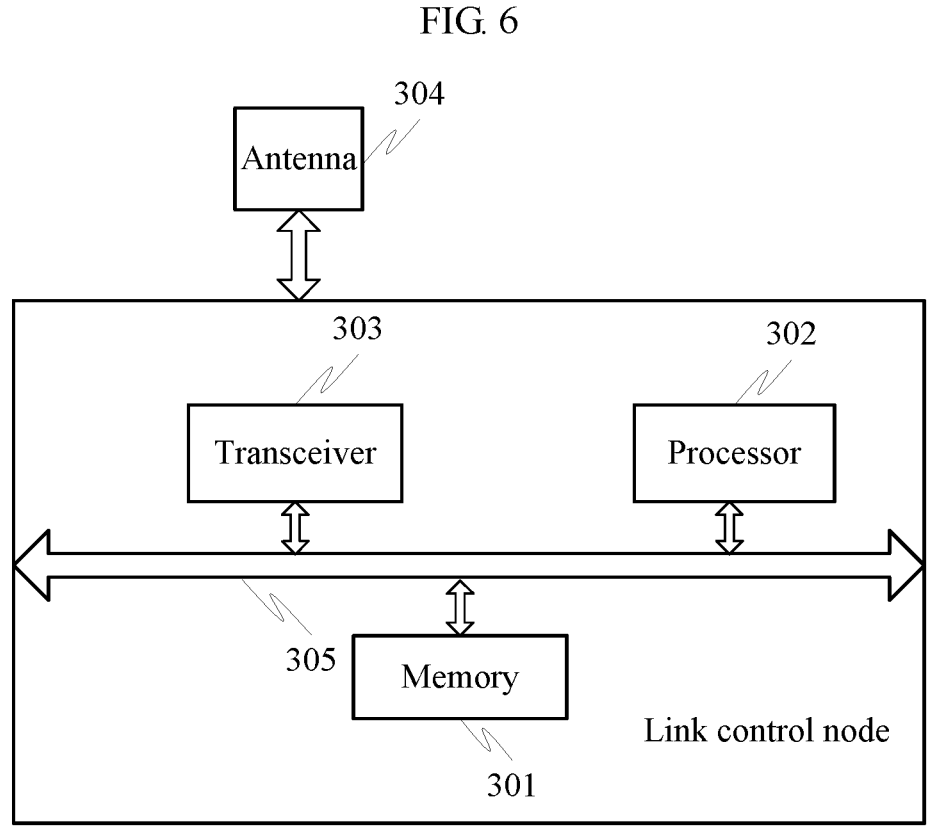
FIG. 7 is a schematic block diagram of another link control node according to an embodiment of the present invention.

An embodiment of the present invention provides a link control node. FIG. 7 shows a schematic block diagram of the link control node. The link control node includes a memory 301, a processor 302, and a transceiver 303.

The memory 301 is configured to store instructions that enable the processor 302 to perform the following operations:

identifying, according to MPTCP link information, an MPTCP sublink that belongs to an MPTCP connection, determining, from the MPTCP sublink, a first MPTCP sublink on which link control needs to be performed, and determining an adjustment manner applicable to the first MPTCP sublink.

The processor 302 is configured to execute the instructions.

The transceiver 303 is configured to send an indication message to two communication parties that use the MPTCP connection, where the indication message is used to instruct the two communication parties to perform the adjustment manner.

The MPTCP link information refers to related information such as a status and an address of the MPTCP connection. For specific contents, refer to related descriptions in other embodiments of the present invention. Details are not described herein.

Optionally, the memory 301 may be further configured to store instructions that enable the processor 302 to perform the following operation: parsing signaling that is exchanged in a communication process of the two communication parties, to obtain the MPTCP link information.

Optionally, the processor 302 may directly listen to and parse related signaling in an initial MPTCP connection establishment process and a TCP subflow joining process, to obtain MPTCP link information of any MPTCP connection that passes by means of the link control node. This embodiment may be applicable to the application scenario shown in FIG. 2.

Optionally, the transceiver 303 may receive an MPTCP connection message sent, to the link control node, by a network node on a transmission channel between the two communication parties of the MPTCP connection. The MPTCP connection message is used to indicate a status of the MPTCP connection and carries the MPTCP link information. This embodiment may be applicable to the application scenario shown in FIG. 3.

Optionally, the memory 301 may be further configured to store instructions that enable the processor 302 to perform the following operations: determining whether a radio resource status of the network node corresponding to the MPTCP sublink meets a first preset condition, and determining, from an MPTCP sublink corresponding to a network node that does not meet the first preset condition and according to an operator management and control policy, at least one MPTCP sublink corresponding to the network node as the first MPTCP sublink.

Optionally, the memory 301 may be further configured to store instructions that enable the processor 302 to perform the following operations: determining whether a link quality status of the MPTCP sublink meets a preset second condition, and determining, from an MPTCP sublink that does not meet the preset second condition and according to an operator management and control policy, at least one MPTCP sublink as the first MPTCP sublink.

The adjustment manner for the first MPTCP sublink may include stopping establishment of the first MPTCP sublink, deleting the first MPTCP sublink, or adjusting a priority of the first MPTCP sublink.

Specifically, the memory 301 may be further configured to store instructions that enable the processor 302 to perform the following operation: when the radio resource status of the network node and/or the link quality status of the MPTCP sublink corresponding to the network node indicate or indicates that a load of the network node exceeds a first preset threshold, determining that the adjustment manner is stopping the first MPTCP sublink from completing the TCP subflow joining process.

Specifically, the memory 301 may be further configured to store instructions that enable the processor 302 to perform the following operation: when the link quality status of the MPTCP sublink indicates that link performance of the first MPTCP sublink is lower than a second preset threshold, and a current status of the first MPTCP sublink indicates that the first MPTCP sublink is available, determining that the adjustment manner is deleting the first MPTCP sublink.

Specifically, the memory 301 may be further configured to store instructions that enable the processor 302 to perform the following operation: when the link quality status of the MPTCP sublink indicates that link performance of the first MPTCP sublink is higher than a third preset threshold, and a current status of the first MPTCP sublink indicates that the first MPTCP sublink is a secondary link, determining that the adjustment manner is increasing a priority of the first MPTCP sublink.

The first preset threshold, the second preset threshold, and the third preset threshold may be determined according to a network operation requirement and adjusted according to a network running status in a device working process. This embodiment of the present invention sets no special limitation thereto.

Optionally, the memory 301 may be further configured to store instructions that enable the processor 302 to perform the following operation:

calculating a parameter value that represents the radio resource status of the network node corresponding to the MPTCP sublink, and/or a parameter value that represents the link quality status of the MPTCP sublink. For specific parameter examples, refer to related descriptions in the apparatus embodiments. Details are not described herein.

It may be understood that the adjustment manner of the MPTCP sublink is not limited to the three manners described above, which is not limited in this embodiment of the present invention.

Optionally, the memory 301 may be further configured to store instructions that enable the processor 302 to perform the following operation: calculating a parameter value that represents the radio resource status of the network node corresponding to the MPTCP sublink, and/or a parameter value that represents the link quality status of the MPTCP sublink. For specific parameter examples, refer to related descriptions in other embodiments of the present invention. Details are not described herein.

Optionally, the transceiver 303 may be configured to send signaling indicating the determined adjustment manner to the two communication parties, to instruct the two communication parties to adjust the first MPTCP sublink, which includes: instructing the two communication parties to stop the establishment of the first MPTCP sublink, or instructing the two communication parties to delete the first MPTCP sublink, or instructing the two communication parties to adjust the priority of the first MPTCP sublink. For a specific signaling form and sending process, refer to related descriptions in the apparatus embodiments. Details are not described herein.

Optionally, the transceiver 303 may receive a measurement report sent by the network node to the link control node. The measurement report indicates the link quality status of the MPTCP sublink corresponding to the network node and/or the radio resource status of the network node corresponding to the MPTCP sublink.

The measurement report may be a measurement report for the network node, or may be a measurement report for an access user, that is, a user equipment that accesses the network node. For contents in the measurement report and a reporting manner, refer to related descriptions in other embodiments of the present invention. Details are not described herein.

Optionally, in another embodiment of the present invention, the memory 301 may be further configured to store instructions that enable the processor 302 to perform the following operations:

determining the link adjustment policy according to the link quality status of the MPTCP sublink and/or the radio resource status of the network node corresponding to the MPTCP sublink that are or is indicated by the measurement report, and also according to the operator management and control policy; and selecting the first MPTCP sublink suitable for link control, and determining the adjustment manner applicable to the first MPTCP sublink.

The link adjustment policy may include first MPTCP link information that is used to identify the first MPTCP sublink, and command information that is used to indicate the adjustment manner for the first MPTCP sublink.

The first MPTCP sublink is an MPTCP sublink that needs to be adjusted and is selected from the MPTCP sublink managed by the link control node. The first MPTCP sublink may be an MPTCP sublink that has not been established, or one or more MPTCP sublinks that has or have been established.

Optionally, the link adjustment policy may be determined based on at least one condition of an operator management and control policy, a radio resource status of a network node corresponding to the MPTCP sublink, or a link status of the MPTCP sublink. For specific contents, refer to related descriptions in other embodiments of the present invention. Details are not described herein.

It may be understood that the foregoing three conditions may be randomly combined, or are separately used as a basis for setting the link adjustment policy. In addition, how to determine a target sublink and its corresponding adjustment manner is not limited to the foregoing three conditions. An appropriate reference may be selected according to a system running requirement as the basis for setting the policy. This embodiment of the present invention sets no special limitation thereto.

Optionally, in another embodiment of the present invention, the memory 301 may be further configured to store instructions that enable the processor 302 to perform the following operations:

obtaining MPTCP link information of a to-be-identified MPTCP sublink, matching the to-be-identified MPTCP sublink with an MPTCP primary link according to MPTCP link information of the MPTCP primary link, and determining a to-be-identified MPTCP sublink that matches the MPTCP primary link as the identified MPTCP sublink; adding the MPTCP link information of the MPTCP sublink that matches the MPTCP primary link to an MPTCP link information table; and updating the MPTCP link information table when a current status of the MPTCP sublink or a current status of the MPTCP primary link changes.

The memory 301 may store the MPTCP link information table, including the MPTCP link information of the MPTCP primary link and the MPTCP sublink.

The MPTCP link information of the MPTCP primary link may be obtained by using signaling that is exchanged by the two communication parties in an initial MPTCP connection establishment process. The MPTCP link information of the MPTCP sublink may be obtained by using signaling that is exchanged by the two communication parties in a TCP subflow joining process.

For a detailed process of identifying the MPTCP sublink and a detailed process of maintaining the MPTCP link information table, refer to descriptions in the embodiment shown in FIG. 5. Details are not described herein.

In addition, the link control node may further include an antenna 304, a bus system 305, and the like. The processor 302 controls operations of the apparatus and may be further referred to as a CPU (central processing unit). The memory 301 may include a read-only memory and a random access memory, and provides instructions and data to the processor 302. The memory 301 may further include a non-volatile random access memory (NVRAM). In a specific application, the transceiver 303 may be coupled to the antenna 305. Components of the apparatus are coupled together by using the bus system 305. In addition to a data bus, the bus system 305 may further include a power bus, a control bus, a status signal bus, and the like. However, for clear description, various types of buses in the figure are marked as the bus system 305.

Figure 8:
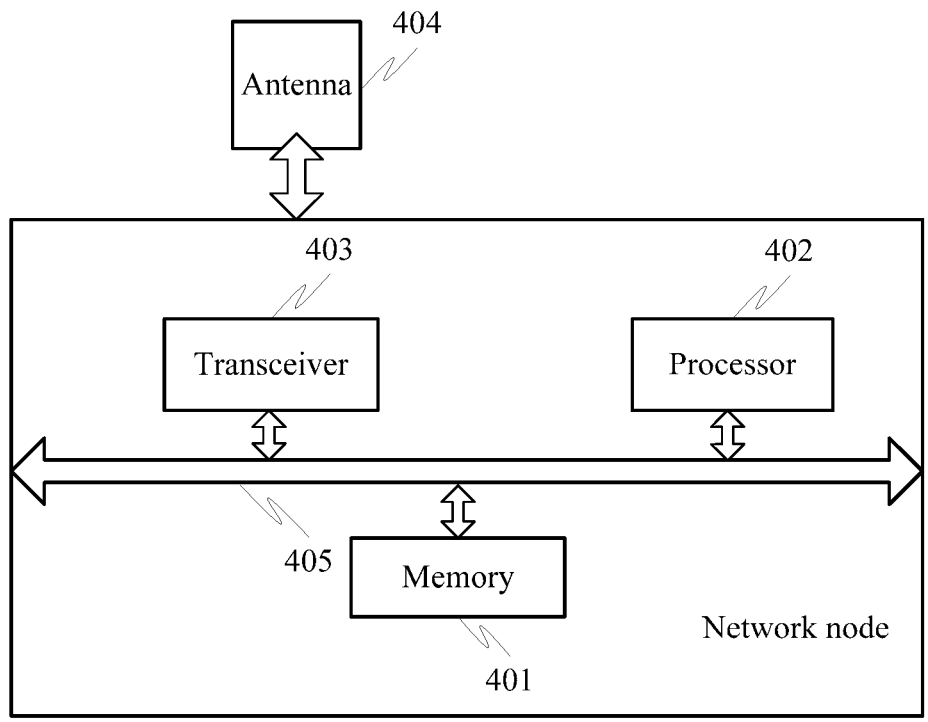
FIG. 8 is a schematic block diagram of another network node according to an embodiment of the present invention.

An embodiment of the present invention provides a network node. The network node is located on a transmission path of an MPTCP sublink and is configured to support data communication between two communication parties that use an MPTCP connection. FIG. 8 shows a block diagram of the network node. The network node includes a memory 401, a processor 402, and a transceiver 403.

The memory 401 is configured to store instructions that enable the processor 402 to perform the following operations: determining a link adjustment policy, where the link adjustment policy is used to instruct to determine, from an MPTCP sublink that corresponds to the network node and belongs to an MPTCP connection, a first MPTCP sublink on which link control needs to be performed, and determining an adjustment manner applicable to the first MPTCP sublink.

The transceiver 403 is configured to send the link adjustment policy to a link control node.

The link control node and the network node may be two standalone apparatuses between which direct or indirect communication exists, or are located in an entity network element, such as a base station. This embodiment of the present invention sets no special limitation thereto.

The link adjustment policy includes first MPTCP link information that is used to identify the first MPTCP sublink, and command information that is used to indicate the adjustment manner.

For specific contents of the link adjustment policy and a method of determining the policy, refer to related descriptions in other embodiments of the present invention. The method is similar to a process in which the link control node determines the first MPTCP sublink and its corresponding adjustment manner. Details are not described herein.

The first MPTCP link information may include address information of the first MPTCP sublink, where the address information includes IP addresses and port numbers of the two communication parties. Optionally, the first MPTCP link information may further include status information that represents a current status of the first MPTCP sublink, where the status information includes information that indicates whether a link is available or unavailable, and information that indicates a link priority.

Optionally, the transceiver 403 may be further configured to report a measurement report to the link control node. The measurement report is used to indicate a link status of a communication link of the multiple TCP subflows and/or a radio resource status of a network node corresponding to the multiple TCP subflows. The link control node may parse the measurement report to determine the link adjustment policy.

Optionally, the processor 402 may be further configured to parse signaling that is exchanged in a communication process of the two communication parties that use the MPTCP connection, to obtain MPTCP link information of the MPTCP sublink.

Specifically, the processor 402 may identify an MPTCP connection status of an access user, generate an MPTCP connection message corresponding to the MPTCP connection status, and report the MPTCP connection message to the link control node. The MPTCP connection message carries the MPTCP link information of the MPTCP sublink of the network node. The link control node may identify current statuses of an MPTCP primary link and the MPTCP sublink according to the MPTCP connection message, select the first MPTCP sublink suitable for link control, and determine the adjustment manner applicable to the first MPTCP sublink.

The network node may further include an antenna 404, a bus system 405, and the like. For specific connection relationships, refer to related descriptions in the embodiment shown in FIG. 6. Details are not described herein.

With the link control node and the network node provided in this embodiment of the present invention, a system running requirement may be determined according to conditions such as an operator management and control policy, a radio resource status of an access point, and a link quality status, to select an MPTCP sublink suitable for link adjustment and to determine its adjustment manner. By adding centralized management and control measures on MPTCP connections, a data transmission process on each MPTCP sublink can be performed on an expected communication link. Therefore, radio resources can be appropriately allocated, and system performance can be improved. Furthermore, a link control node provided in the embodiments of the present invention may be flexibly disposed on an access network side, to effectively manage and control an MPTCP connection.

An embodiment of the present invention provides a link control method, which may be performed by a link control node. The link control node may be deployed on an access network side.

Figure 9:
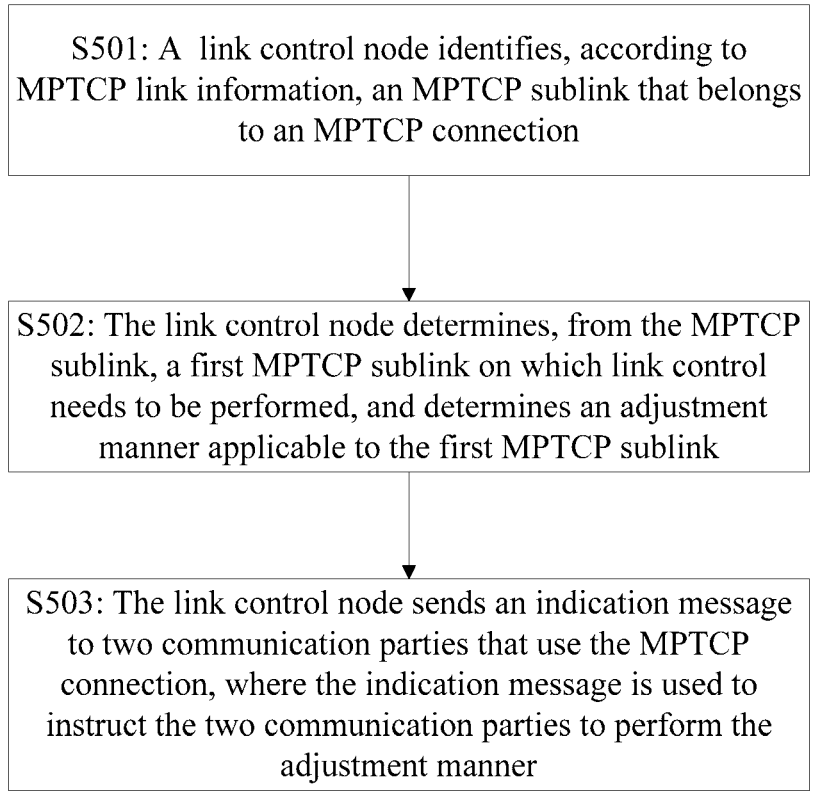
FIG. 9 is a schematic flowchart of a link control method according to an embodiment of the present invention.

FIG. 9 shows a procedure of the method, including steps S501 to S503.

S501: The link control node identifies, according to MPTCP link information, an MPTCP sublink that belongs to an MPTCP connection.

The MPTCP link information refers to related information such as a status and an address of the MPTCP connection. For specific contents, refer to related descriptions in other embodiments of the present invention. Details are not described herein.

Optionally, the link control node parses signaling that is exchanged in a communication process of the two communication parties to obtain the MPTCP link information.

In one embodiment of the present invention, the link control node may directly listen to and parse related signaling in an initial MPTCP connection establishment process and a TCP subflow joining process, to obtain MPTCP link information of any MPTCP connection that passes by means of the link control node. This embodiment may be applicable to the application scenario shown in FIG. 2.

In another embodiment of the present invention, a network node on a transmission channel between the two communication parties of the MPTCP connection may send an MPTCP connection message to the link control node. The MPTCP connection message is used to indicate a status of the MPTCP connection and carries the MPTCP link information. This embodiment may be applicable to the application scenario shown in FIG. 3.

S502: The link control node determines, from the MPTCP sublink, a first MPTCP sublink on which link control needs to be performed, and determines an adjustment manner applicable to the first MPTCP sublink.

S503: The link control node sends an indication message to the two communication parties that use the MPTCP connection, where the indication message is used to instruct the two communication parties to perform the adjustment manner.

Optionally, in the step S502, the link control node may determine whether a radio resource status of a network node corresponding to the MPTCP sublink meets a first preset condition, and determine, from an MPTCP sublink corresponding to a network node that does not meet the first preset condition and according to an operator management and control policy, at least one MPTCP sublink corresponding to the network node as the first MPTCP sublink.

Optionally, whether a link quality status of the MPTCP sublink meets a preset second condition may be determined, and from an MPTCP sublink that does not meet the preset second condition and according to an operator management and control policy, at least one MPTCP sublink is determined as the first MPTCP sublink.

The adjustment manner for the first MPTCP sublink may include stopping establishment of the first MPTCP sublink, deleting the first MPTCP sublink, or adjusting a priority of the first MPTCP sublink.

Specifically, when the radio resource status of the network node and/or the link quality status of the MPTCP sublink corresponding to the network node indicate or indicates that a load of the network node exceeds a first preset threshold, it may be determined that the adjustment manner is stopping the first MPTCP sublink from completing the TCP subflow joining process.

Specifically, when the link quality status of the MPTCP sublink indicates that link performance of the first MPTCP sublink is lower than a second preset threshold, and a current status of the first MPTCP sublink indicates that the first MPTCP sublink is available, it may be determined that the adjustment manner is deleting the first MPTCP sublink.

Specifically, when the link quality status of the MPTCP sublink indicates that link performance of the first MPTCP sublink is higher than a third preset threshold, and a current status of the first MPTCP sublink indicates that the first MPTCP sublink is a secondary link, it may be determined that the adjustment manner is increasing a priority of the first MPTCP sublink.

The first preset threshold, the second preset threshold, and the third preset threshold may be determined according to a network operation requirement and adjusted according to a network running status in a device working process. This embodiment of the present invention sets no special limitation thereto.

Optionally, the link control node may calculate a parameter value that represents the radio resource status of the network node corresponding to the MPTCP sublink, and/or a parameter value that represents the link quality status of the MPTCP sublink. For specific parameter examples, refer to related descriptions in the apparatus embodiments. Details are not described herein.

It may be understood that the adjustment manner of the MPTCP sublink is not limited to the three manners described above, which is not limited in this embodiment of the present invention.

Optionally, in the step S503, the link control node may instruct, by means of signaling, the two communication parties to adjust the first MPTCP sublink, which includes: instructing the two communication parties to stop the establishment of the first MPTCP sublink, or instructing the two communication parties to delete the first MPTCP sublink, or instructing the two communication parties to adjust the priority of the first MPTCP sublink. For a specific signaling form and sending process, refer to related descriptions in the apparatus embodiments. Details are not described herein.

Figure 10:
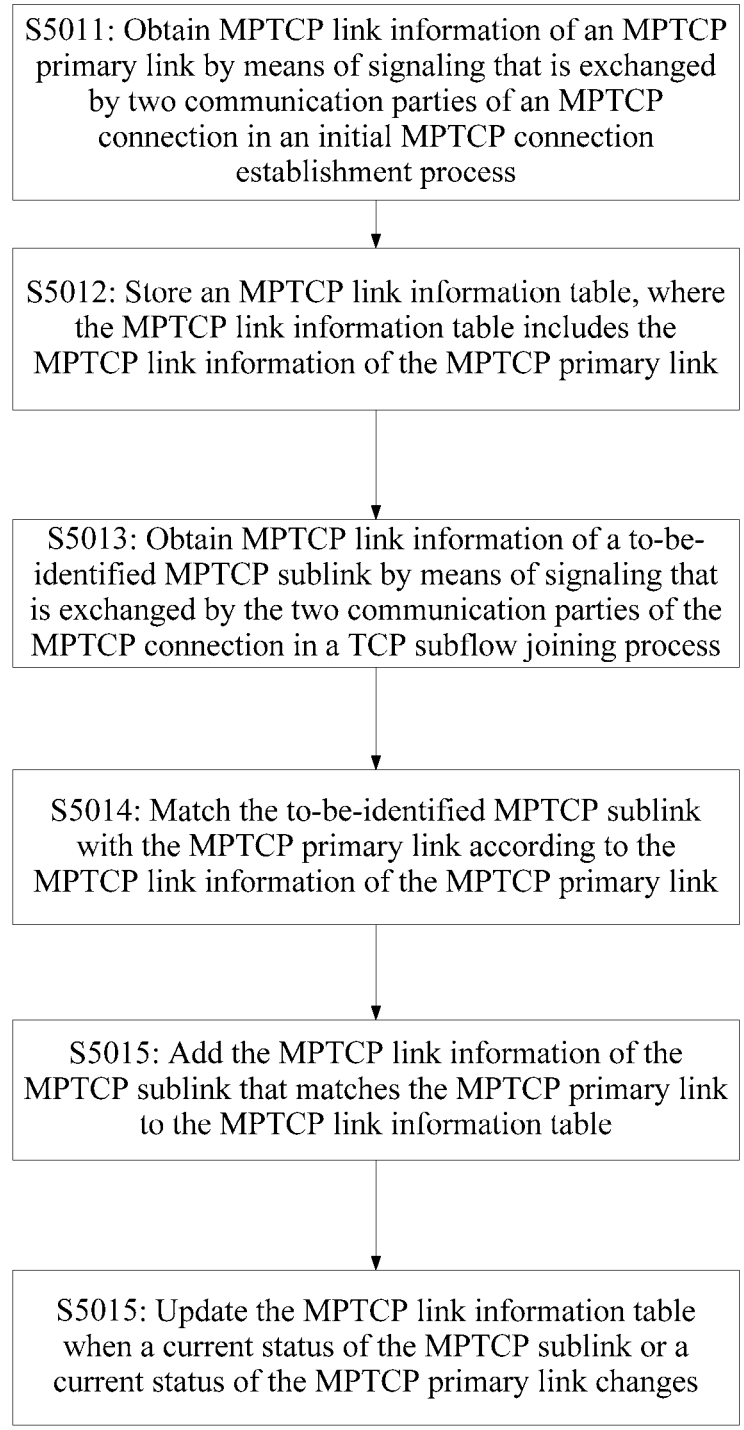
FIG. 10 is a schematic flowchart of an MPTCP sublink identification method according to an embodiment of the present invention.

Optionally, in another embodiment of the present invention, the step S501 may include steps S5011 to S5014, and the procedure is shown in FIG. 10. This embodiment may be applicable to the application scenario shown in FIG. 2.

S5011: The link control node obtains MPTCP link information of an MPTCP primary link by means of signaling that is exchanged by two communication parties of the MPTCP connection in an initial MPTCP connection establishment process.

S5012: The link control node stores an MPTCP link information table, where the MPTCP link information table includes the MPTCP link information of the MPTCP primary link.

S5013: The link control node obtains MPTCP link information of a to-be-identified MPTCP sublink by means of signaling that is exchanged by the two communication parties of the MPTCP connection in a TCP subflow joining process.

S5014: The link control node matches the to-be-identified MPTCP sublink with the MPTCP primary link according to the MPTCP link information of the MPTCP primary link, and determines a to-be-identified MPTCP sublink that matches the MPTCP primary link as the identified MPTCP sublink.

S5015: The link control node adds the MPTCP link information of the MPTCP sublink that matches the MPTCP primary link to the MPTCP link information table.

S5016: The link control node updates the MPTCP link information table when a current status of the MPTCP sublink or a current status of the MPTCP primary link changes.

For a specific process of maintaining the MPTCP link information table, refer to related descriptions in other embodiments of the present invention. Details are not described herein.

Optionally, the MPTCP link information table may include MPTCP link information of a same MPTCP connection, or MPTCP link information of multiple MPTCP connections. The link control node may combine, by an address of an MPTCP connection, information related to all MPTCP connections in a system into an information table, and manage an MPTCP primary link and a sublink of each MPTCP connection in the entire system.

By searching in the MPTCP link information table, the link control node may learn an association between a to-be-processed MPTCP sublink and the MPTCP primary link, where the association includes information indicating that a current MPTCP sublink available for a user equipment to perform data communication belongs to which MPTCP connection, information about which network node the user equipment uses to access an access network, or the like. The link control node determines s status of the MPTCP sublink, and processes the MPTCP sublink according to an appropriate processing manner.

An embodiment of the present invention further provides a link control method. This embodiment may be applicable to the application scenario shown in FIG. 3. Two communication parties in this embodiment are user equipments that access an access network by using a network node and a server on a core network side respectively.

Figure 11:
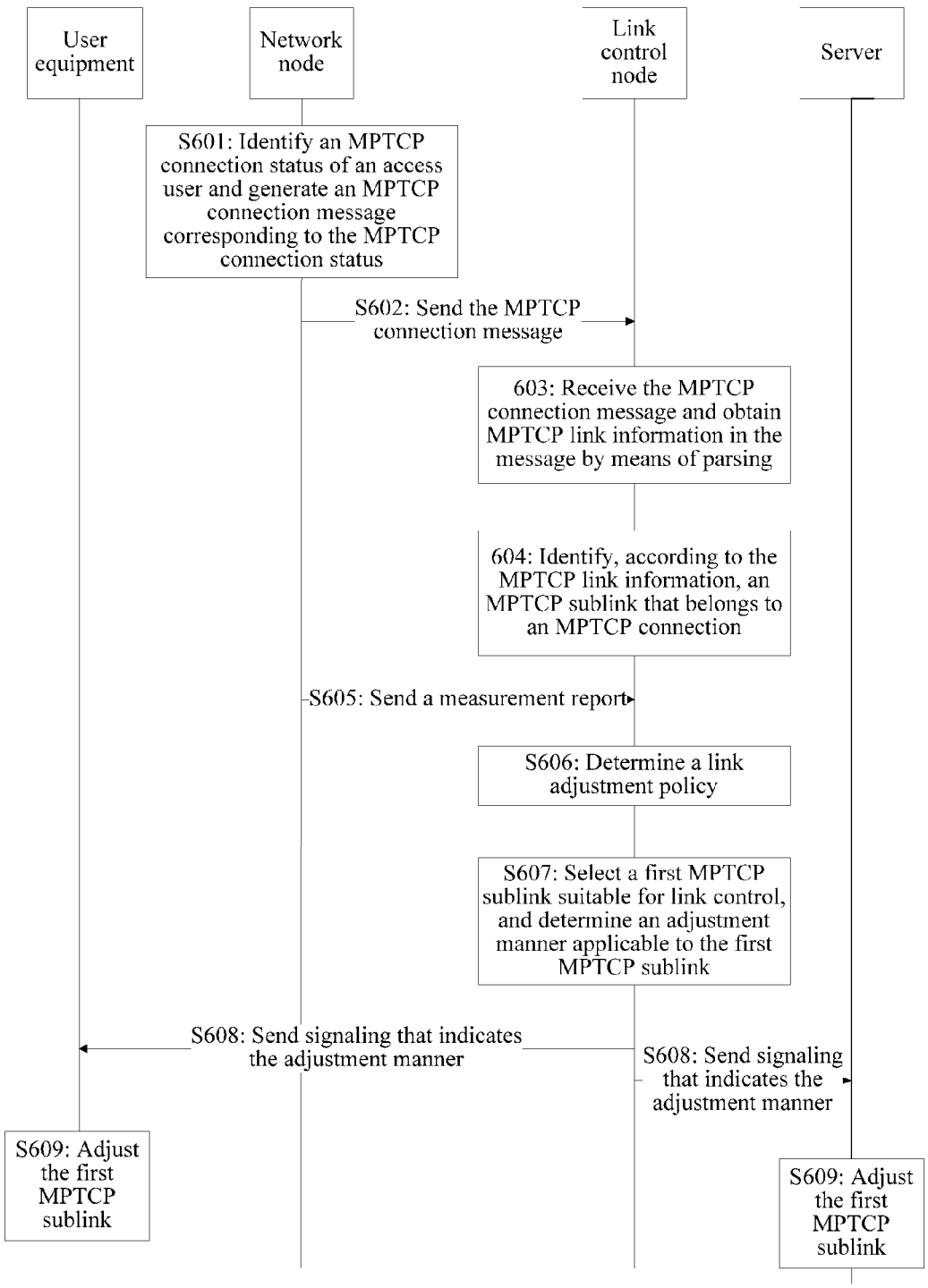
FIG. 11 is a schematic flowchart of another link control method according to an embodiment of the present invention.

FIG. 11 shows a procedure of the method, including steps S601 to S609.

S601: The network node identifies an MPTCP connection status of an access user and generates an MPTCP connection message corresponding to the MPTCP connection status, where the MPTCP connection message includes MPTCP link information of an MPTCP primary link and a to-be-identified MPTCP sublink.

For a process in which the network node generates the MPTCP connection message, refer to related descriptions in the embodiment shown in FIG. 5. Details are not described herein.

The network node is located on a transmission channel between two communication parties of an MPTCP connection and corresponds to at least one MPTCP sublink. That is, the user equipment accesses the access network by using the network node and establishes the MPTCP connection to the server, which serves as the other party.

S602: The network node sends the MPTCP connection message to a link control node.

S603: The link control node receives the MPTCP connection message and obtains the MPTCP link information in the message by means of parsing.

S604: The link control node identifies, according to the MPTCP link information, an MPTCP sublink that belongs to an MPTCP connection.

For a specific identifying process, refer to related contents in the embodiment shown in FIG. 9. Details are not described herein.

Optionally, the link control node may receive multiple MPTCP connection messages of different types. The multiple MPTCP connection messages are reported by the network node and are of multiple different TCP subflows that belong to a same MPTCP connection.

S605: The network node sends a measurement report to the link control node, where the measurement report indicates a link quality status of the MPTCP sublink corresponding to the network node and/or a radio resource status of the network node corresponding to the MPTCP sublink.

Optionally, the measurement report may be a measurement report for the network node, or may be a measurement report for an access user, that is, a user equipment that accesses the network node. For contents in the measurement report and a reporting manner, refer to related descriptions in other embodiments of the present invention. Details are not described herein.

It may be understood that the measurement report may be sent at any moment, for example, may be sent before the method is performed or at the same time when the steps S601 to S604 are performed. A sequence of the steps in this embodiment is merely exemplary, which should not be construed as a limitation on this embodiment of the present invention.

S606: The link control node determines a link adjustment policy according to the link quality status of the MPTCP sublink and/or the radio resource status of the network node corresponding to the MPTCP sublink that are or is indicated by the measurement report, and also according to an operator management and control policy.

The link adjustment policy may include first MPTCP link information that is used to identify a first MPTCP sublink, and command information that is used to indicate the adjustment manner for the first MPTCP sublink.

The first MPTCP sublink is an MPTCP sublink that needs to be adjusted and is selected from the MPTCP sublink managed by the link control node. The first MPTCP sublink may be an MPTCP sublink that has not been established, or one or more MPTCP sublinks that has or have been established.

Optionally, the link adjustment policy may be determined based on at least one condition of an operator management and control policy, a radio resource status of a network node corresponding to the MPTCP sublink, or a link status of the MPTCP sublink.

Optionally, the link control node may determine the link adjustment policy according to the operator management and control policy. The operator management and control policy includes items that ensure system load balancing, link resource utilization, and an accounting policy, and that represent an operator's management and control tendency on an entire network.

Optionally, the link control node may further determine the link adjustment policy according to a calculation result of the radio resource status, which includes: determining a network node on which link control needs to be performed, and selecting at least one MPTCP sublink corresponding to the network node, to perform status adjustment.

Optionally, the link control node may further determine the link adjustment policy according to a calculation result of the link quality statuses, which includes: determining whether a link quality status of the at least one MPTCP sublink meets a preset condition, and selecting at least one MPTCP sublink from an MPTCP sublink that does not meet the preset condition, to perform status adjustment.

It may be understood that the foregoing three conditions may be randomly combined, or are separately used as a basis for setting the link adjustment policy. In addition, how to determine a target sublink and its corresponding adjustment manner is not limited to the foregoing three conditions. An appropriate reference may be selected according to a system running requirement as the basis for setting the policy. This embodiment of the present invention sets no special limitation thereto.

The link control node may further calculate according to the radio resource status or the link quality statuses reported by the network node, to obtain a more accurate reference. For a specific calculation process, refer to related contents in the prior art. Details are not described in this embodiment of the present invention.

For detailed contents in the link adjustment policy, refer to related descriptions in other embodiments of the present invention. Details are not described herein.

It should be noted that a format and contents of the link adjustment policy are not limited, and may include addresses, status information, and specific processing manners of the MPTCP primary link and the MPTCP sublink.

S607: According to the link adjustment policy, the link control node selects a first MPTCP sublink suitable for link control, and determines an adjustment manner applicable to the first MPTCP sublink.

Specifically, the link control node may search in the identified MPTCP sublink according to the first MPTCP link information that is used to identify the first MPTCP sublink and that is included in the link adjustment policy, and use an MPTCP sublink whose MPTCP link information is the same as the first MPTCP link information as the first MPTCP sublink.

S608: According to command information that indicates the adjustment manner applicable to the first MPTCP sublink and that is included in the link adjustment policy, the link control node separately sends signaling that indicates the adjustment manner to the user equipment and the server.

S609: The user equipment and the server execute the received signaling to adjust the first MPTCP sublink.

For a type of the link adjustment manner and a method of adjusting a link, refer to related descriptions in other embodiments of the present invention. Details are not described herein.

Optionally, in another embodiment of the present invention, the network node may determine the link adjustment policy and send it to the link control node, and the link control node determines, according to a current status of the MPTCP sublink in the stored MPTCP link information, a specific manner of performing the policy, for example, a manner of sending which signaling to adjust an already selected link. For a specific process of how the network node determines the link adjustment policy, refer to related descriptions in other embodiments of the present invention. Details are not described herein.

Optionally, the link control node may receive an initial policy and a link status and/or a radio resource status that are reported by the network node, calculate the link status or the radio resource status, and make the best choice according to the link status or the radio resource status and the initial policy reported by the network node.

With the link control method provided in this embodiment of the present invention, a system running requirement may be determined according to conditions such as an operator management and control policy, a radio resource status of an access point, and a link quality status, to select an MPTCP sublink suitable for link adjustment and to determine its adjustment manner. By adding centralized management and control measures on MPTCP connections, a data transmission process on each MPTCP sublink can be performed on an expected communication link. Therefore, radio resources can be appropriately allocated, and system performance can be improved. Furthermore, a link control node provided in the embodiments of the present invention may be flexibly disposed on an access network side, to effectively manage and control an MPTCP connection.

An embodiment of the present invention further provides a communications system, including the link control node shown in FIG. 5 or FIG. 7, and the network node shown in FIG. 6 or FIG. 8. The two devices are connected in a wired or wireless manner to perform direct or indirect communication. For detailed descriptions of functions and structures of the devices in the system, refer to related descriptions in other embodiments of the present invention. Details are not described herein.

Figure 12:
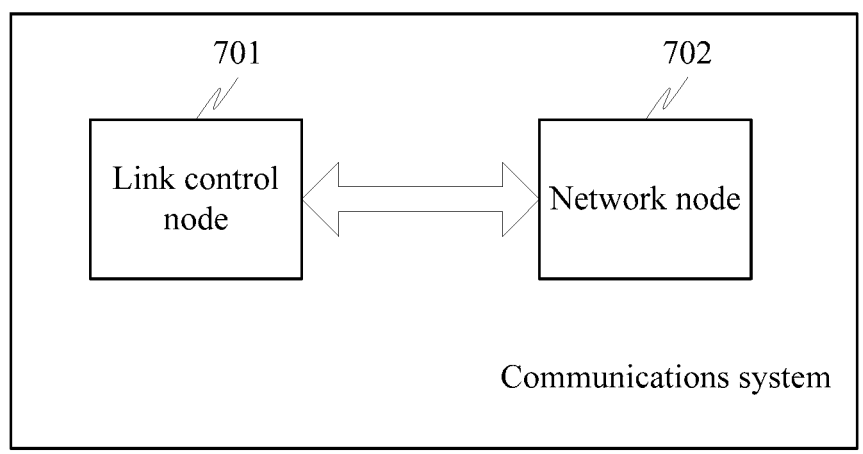
FIG. 12 is a schematic diagram of a communications system according to an embodiment of the present invention.

It may be clearly understood by a person skilled in the art that, for ease and brief description, detailed working processes of the foregoing system, apparatus, and method provide reference to each other and complement each other. For example, the link control node shown in FIG. 5 or FIG. 7 and the network node shown in FIG. 6 or FIG. 8 may be configured to perform the link control method shown in any embodiment shown in FIG. 9 to FIG. 11. The link control method shown in any embodiment shown in FIG. 9 to FIG. 11 may be implemented in the communications system in the embodiment shown in FIG. 12. Details are not described herein.

Based on the foregoing descriptions of the embodiments, a person skilled in the art may clearly understand that the present invention may be implemented by software in addition to a necessary universal hardware platform or by hardware only. In most circumstances, the former is a preferred implementation manner. Based on such an understanding, the technical solutions of the present invention essentially, or the part contributing to the prior art may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a Universal Serial Bus (USB) flash drive, a removable hard disk, a read-only memory (ROM), a random access memory (RAM), a magnetic disk, or an optical disc.

In the several embodiments provided in the present application, it should be understood that the disclosed apparatus, system, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. The units described as separate parts may or may not be physically separate, and parts displayed as units may or may not be physical units, may be located in one position, or may be distributed on a plurality of network units. Some or all of the modules may be selected according to actual needs to achieve the objectives of the solutions of the embodiments. A person of ordinary skill in the art may understand and implement the embodiments of the present invention without creative efforts.

In addition, the apparatus, system and method described herein, and schematic diagrams of different embodiments can be combined or integrated with other systems, modules, technologies, or methods without departing from the scope of this application. In addition, the displayed or discussed mutual couplings or direct couplings or communication connections may be implemented by means of some interfaces. The indirect couplings or communication connections between the base stations or units may be implemented in electronic, mechanical, or other forms.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims. Additionally, statements made herein characterizing the invention refer to an embodiment of the invention and not necessarily all embodiments.

What is claimed is:
1. An apparatus comprising:
a processor configured to:
identify, according to Multipath Transmission Control Protocol (MPTCP) link information, at least one MPTCP sublink that belongs to an MPTCP connection;

determine, from the at least one MPTCP sublink, a first MPTCP sublink on which link control needs to be performed;

determine an adjustment applicable to the first MPTCP sublink, wherein the adjustment includes stopping the first MPTCP sublink from completing a TCP subflow joining process or deleting the first MPTCP sublink; and obtain MPTCP link information of a to-be-identified MPTCP sublink matching the to-be-identified MPTCP sublink with an MPTCP primary link according to MPTCP link information of the MPTCP primary link that belongs to the MPTCP connection, and determine a to-be-identified MPTCP sublink that matches the MPTCP primary link as the identified MPTCP sublink;

a storage configured to store an MPTCP link information table, wherein the MPTCP link information table comprises the MPTCP link information of the MPTCP primary link;

the processor is further configured to:

add the MPTCP link information of the MPTCP sublink that matches the MPTCP primary link to the MPTCP link information table; and update the MPTCP link information table when a current status of the MPTCP sublink or a current status of the MPTCP primary link changes; and a transmitter configured to cooperate with the processor to send to two communication parties that use the MPTCP connection, an indication message for instructing the two communication parties to perform the adjustment.

2. The apparatus according to claim 1, wherein the processor is configured to:

determine whether a radio resource status of at least one network node corresponding to the at least one MPTCP sublink meets a first preset condition, and determine, from an MPTCP sublink corresponding to a network node that does not meet the first preset condition and according to an operator management and control policy, at least one MPTCP sublink corresponding to the network node as the first MPTCP sublink, or determine whether a link quality status of the at least one MPTCP sublink meets a preset second condition, and determine, from an MPTCP sublink that does not meet the preset second condition and according to an operator management and control policy, the at least one MPTCP sublink as the first MPTCP sublink;

wherein the network node is located on a transmission path of the MPTCP sublink and is configured to support data communication between the two communication parties.

3. The apparatus according to claim 2, wherein the processor is further configured to:

determine that the adjustment is stopping the first MPTCP sublink from completing a TCP subflow joining process when the radio resource status of the network node and/or the link quality status of the MPTCP sublink corresponding to the network node indicates that a load of the network node exceeds a first preset threshold; or determine that the adjustment is deleting the first MPTCP sublink when the link quality status of the MPTCP sublink indicates that link performance of the first MPTCP sublink is lower than a preset second threshold and a current status of the first MPTCP sublink indicates that the first MPTCP sublink is available.

4. The apparatus according to claim 1, wherein the processor is further configured to:

determine, according to a link adjustment policy, the first MPTCP sublink and the adjustment applicable to the first MPTCP sublink, wherein the link adjustment policy comprises first MPTCP link information for identifying the first MPTCP sublink and command information for indicating the adjustment.

5. The apparatus according to claim 4, wherein the processor is further configured to:

search in the identified MPTCP sublink according to the first MPTCP link information, and use an MPTCP sublink whose MPTCP link information is the same as the first MPTCP link information as the first MPTCP sublink.

6. A link control method comprising:

identifying, by a link control node according to Multipath Transmission Control Protocol (MPTCP) link information, at least one MPTCP sublink that belongs to an MPTCP connection, including obtaining MPTCP link information of a to-be-identified MPTCP sublink, matching the to-be-identified MPTCP sublink with an MPTCP primary link according to MPTCP link information of the MPTCP primary link that belongs to the MPTCP connection, and determining a to-be-identified MPTCP sublink that matches the MPTCP primary link as the identified MPTCP sublink;

determining, by the link control node from the at least one MPTCP sublink, a first MPTCP sublink on which link control needs to be performed, and determining an adjustment applicable to the first MPTCP sublink, wherein the adjustment includes stopping the first MPTCP sublink from completing a TCP subflow joining process or deleting the first MPTCP sublink;

instructing, by the link control node, two communication parties that use the MPTCP connection to perform the determined adjustment applicable to the first MPTCP sublink;

storing an MPTCP link information table, wherein the MPTCP link information table comprises the MPTCP link information of the MPTCP primary link;

adding the MPTCP link information of the MPTCP sublink that matches the MPTCP primary link to the MPTCP link information table; and updating the MPTCP link information table when a current status of the MPTCP sublink or a current status of the MPTCP primary link changes.

7. The method according to claim 6, wherein determining the first MPTCP sublink on which link control needs to be performed comprises:

determining whether a radio resource status of at least one network node corresponding to the at least one MPTCP sublink meets a first preset condition, and determining, from an MPTCP sublink corresponding to a network node that does not meet the first preset condition and according to an operator management and control policy, at least one MPTCP sublink corresponding to the network node as the first MPTCP sublink, or determining whether a link quality status of the at least one MPTCP sublink meets a preset second condition, and determining, from an MPTCP sublink that does not meet the preset second condition and according to an operator management and control policy, the at least one MPTCP sublink as the first MPTCP sublink;

wherein the network node is located on a transmission path of the MPTCP sublink and is configured to support data communication between the two communication parties.

8. The method according to claim 7, wherein determining the adjustment applicable to the first MPTCP sublink comprises:
determining that the adjustment is stopping the first MPTCP sublink from completing a TCP subflow joining process when the radio resource status of the network node and/or the link quality status of the MPTCP sublink corresponding to the network node indicates that a load of the network node exceeds a first preset threshold; or
determining that the adjustment is deleting the first MPTCP sublink when the link quality status of the MPTCP sublink indicates that link performance of the first MPTCP sublink is lower than a second preset threshold and a current status of the first MPTCP sublink indicates that the first MPTCP sublink is available.

9. The method according to claim 6, wherein determining the first MPTCP sublink on which link control needs to be performed and determining the adjustment applicable to the first MPTCP sublink comprises:
determining, by the link control node according to a link adjustment policy, the first MPTCP sublink and the adjustment applicable to the first MPTCP sublink, wherein the link adjustment policy comprises first MPTCP link information for identifying the first MPTCP sublink and command information for indicating the adjustment.

10. The method according to claim 9, wherein determining the first MPTCP sublink according to the link adjustment policy comprises:
searching in the identified MPTCP sublink according to the first MPTCP link information, and using an MPTCP sublink whose MPTCP link information is the same as the first MPTCP link information as the first MPTCP sublink.

11. A non-transitory machine-readable medium having processor-executable instructions stored thereon, the processor-executable instructions, when executed, facilitating performance of the following:
identifying, according to Multipath Transmission Control Protocol (MPTCP) link information, at least one MPTCP sublink that belongs to an MPTCP connection, including
obtaining MPTCP link information of a to-be-identified MPTCP sublink,
matching the to-be-identified MPTCP sublink with an MPTCP primary link according to MPTCP link information of the MPTCP primary link that belongs to the MPTCP connection, and
determining a to-be-identified MPTCP sublink that matches the MPTCP primary link as the identified MPTCP sublink;
determining, from the at least one MPTCP sublink, a first MPTCP sublink on which link control needs to be performed;
determining an adjustment applicable to the first MPTCP sublink, wherein the adjustment includes stopping the first MPTCP sublink from completing a TCP subflow joining process or deleting the first MPTCP sublink;
instructing two communication parties that use the MPTCP connection to perform the adjustment applicable to the first MPTCP sublink;
storing an MPTCP link information table comprising the MPTCP link information of the MPTCP primary link;
adding the MPTCP link information of the MPTCP sublink that matches the MPTCP primary link to the MPTCP link information table; and
updating the MPTCP link information table when a current status of the MPTCP sublink or a current status of the MPTCP primary link changes.

12. The medium according to claim 11, wherein determining the first MPTCP sublink on which link control needs to be performed comprises:
determining whether a radio resource status of at least one network node corresponding to the at least one MPTCP sublink meets a first preset condition, and determining, from an MPTCP sublink corresponding to a network node that does not meet the first preset condition and according to an operator management and control policy, at least one MPTCP sublink corresponding to the network node as the first MPTCP sublink, or
determining whether a link quality status of the at least one MPTCP sublink meets a preset second condition, and determining, from an MPTCP sublink that does not meet the preset second condition and according to an operator management and control policy, the at least one MPTCP sublink as the first MPTCP sublink;
wherein the network node is located on a transmission path of the MPTCP sublink and is configured to support data communication between the two communication parties.

13. The medium according to claim 12, wherein determining the adjustment applicable to the first MPTCP sublink comprises:
determining that the adjustment manner is stopping the first MPTCP sublink from completing a TCP subflow joining process when the radio resource status of the network node and/or the link quality status of the MPTCP sublink corresponding to the network node indicates that a load of the network node exceeds a first preset threshold; or
determining that the adjustment manner is deleting the first MPTCP sublink when the link quality status of the MPTCP sublink indicates that link performance of the first MPTCP sublink is lower than a second preset threshold and a current status of the first MPTCP sublink indicates that the first MPTCP sublink is available.

14. The medium according to claim 11, wherein determining the first MPTCP sublink on which link control needs to be performed and determining the adjustment applicable to the first MPTCP sublink comprises:
determining, by the link control node according to a link adjustment policy, the first MPTCP sublink and the adjustment applicable to the first MPTCP sublink, wherein the link adjustment policy comprises first MPTCP link information for identifying the first MPTCP sublink and command information for indicating the adjustment.

15. The medium according to claim 14, wherein determining the first MPTCP sublink according to the link adjustment policy comprises:
searching in the identified MPTCP sublink according to the first MPTCP link information, and using an MPTCP sublink whose MPTCP link information is the same as the first MPTCP link information as the first MPTCP sublink.

* * * * *